US012361237B2

(12) United States Patent
Uehara

(10) Patent No.: US 12,361,237 B2
(45) Date of Patent: Jul. 15, 2025

(54) VIDEO MANAGEMENT SYSTEM, VIDEO MANAGEMENT METHOD, READING APPARATUS, AND INFORMATION PROCESSING APPARATUS

(71) Applicant: CANON KABUSHIKI KAISHA, Tokyo (JP)

(72) Inventor: Tomoya Uehara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/514,214

(22) Filed: Nov. 20, 2023

(65) Prior Publication Data

US 2024/0086657 A1 Mar. 14, 2024

Related U.S. Application Data

(63) Continuation of application No. PCT/JP2022/021515, filed on May 26, 2022.

(30) Foreign Application Priority Data

Jun. 2, 2021 (JP) .................................. 2021-093151

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ................. G06K 7/10366; G06K 19/0723

USPC ......................................................... 235/451
See application file for complete search history.

(56) References Cited

U.S. PATENT DOCUMENTS

| 10,140,486 | B1* | 11/2018 | Lavery | ................... | G07G 3/003 |
| 2018/0184144 | A1* | 6/2018 | Corrall | ............. | G08B 13/19665 |
| 2024/0062597 | A1 | 2/2024 | Fujii | | |

FOREIGN PATENT DOCUMENTS

| JP | 2006-217336 A | 8/2006 |
| JP | 2007-3448 A | 1/2007 |
| JP | 2007-13911 A | 1/2007 |
| JP | 2007-249516 A | 9/2007 |

(Continued)

OTHER PUBLICATIONS

U.S. Appl. No. 18/433,706, filed Feb. 6, 2024 by Mitsuhide Murofushi.

(Continued)

*Primary Examiner* — Daniel A Hess
(74) *Attorney, Agent, or Firm* — VENABLE LLP

(57) ABSTRACT

There is provided a video management system for managing a video of a real space captured by a capturing apparatus, including: a first reading unit configured to emit an electromagnetic wave to a tag reading range and read information that is sent back from a radio frequency identification (RFID) tag utilizing energy of the electromagnetic wave; a first RFID tag that stores first tag identification information; and a data management unit configured to cause a database to store a reading result by the first reading unit in association with the video so that a portion in the video captured by the capturing apparatus corresponding to a time at which the first tag identification information has been read from the first RFID tag by the first reading unit is able to be extracted.

17 Claims, 26 Drawing Sheets

(56) References Cited

FOREIGN PATENT DOCUMENTS

| | | |
|---|---|---|
| JP | 2009-93558 A | 4/2009 |
| JP | 2017-107420 A | 6/2017 |
| JP | 2019-148946 A | 9/2019 |

OTHER PUBLICATIONS

European Search Report dated May 6, 2025 during prosecution of European Application No. EP109142.
Japanese Office Action issued May 12, 2025 during prosecution of Japanese Patent Application No. 2021-093151. (English machine translation included).

\* cited by examiner

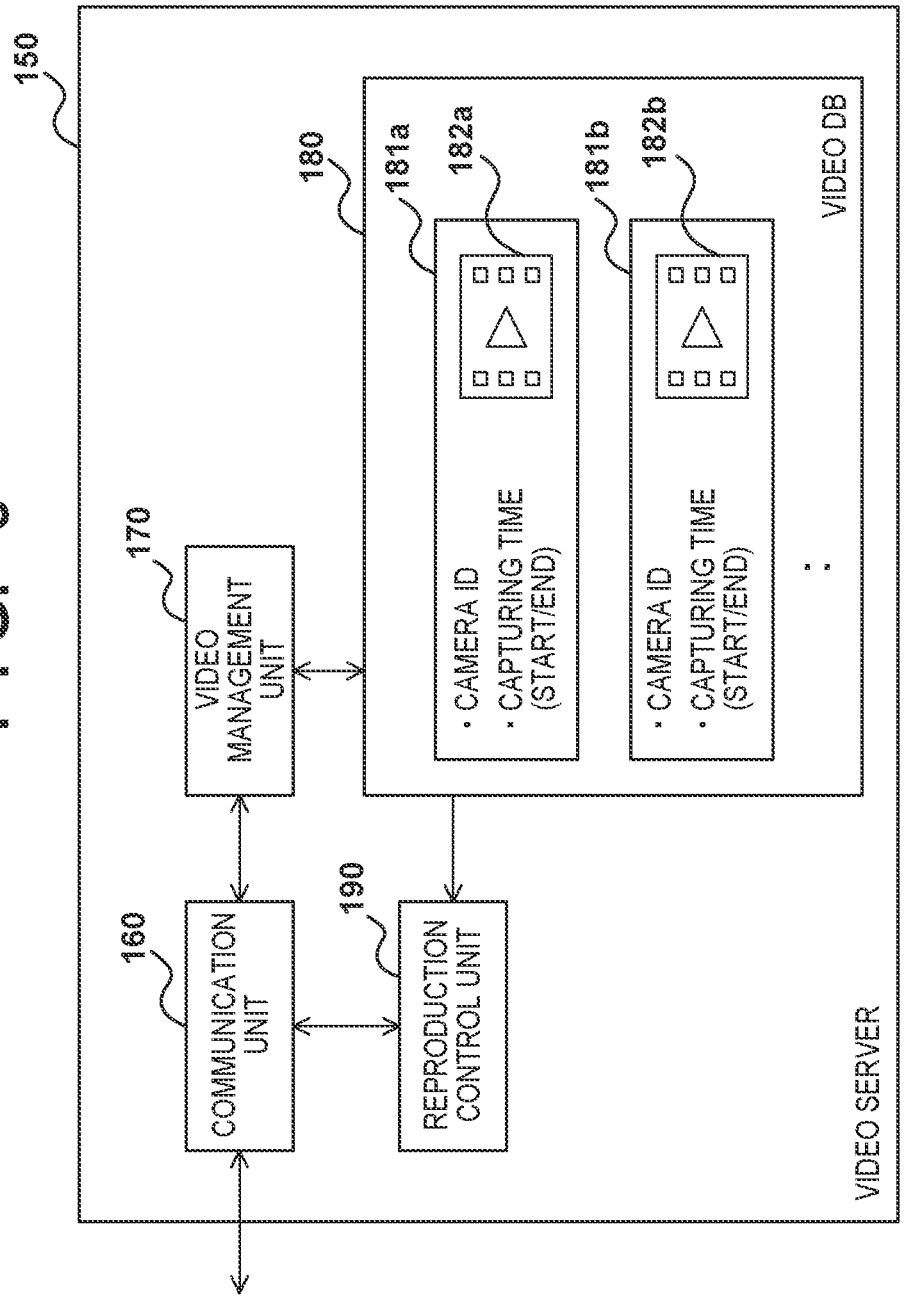

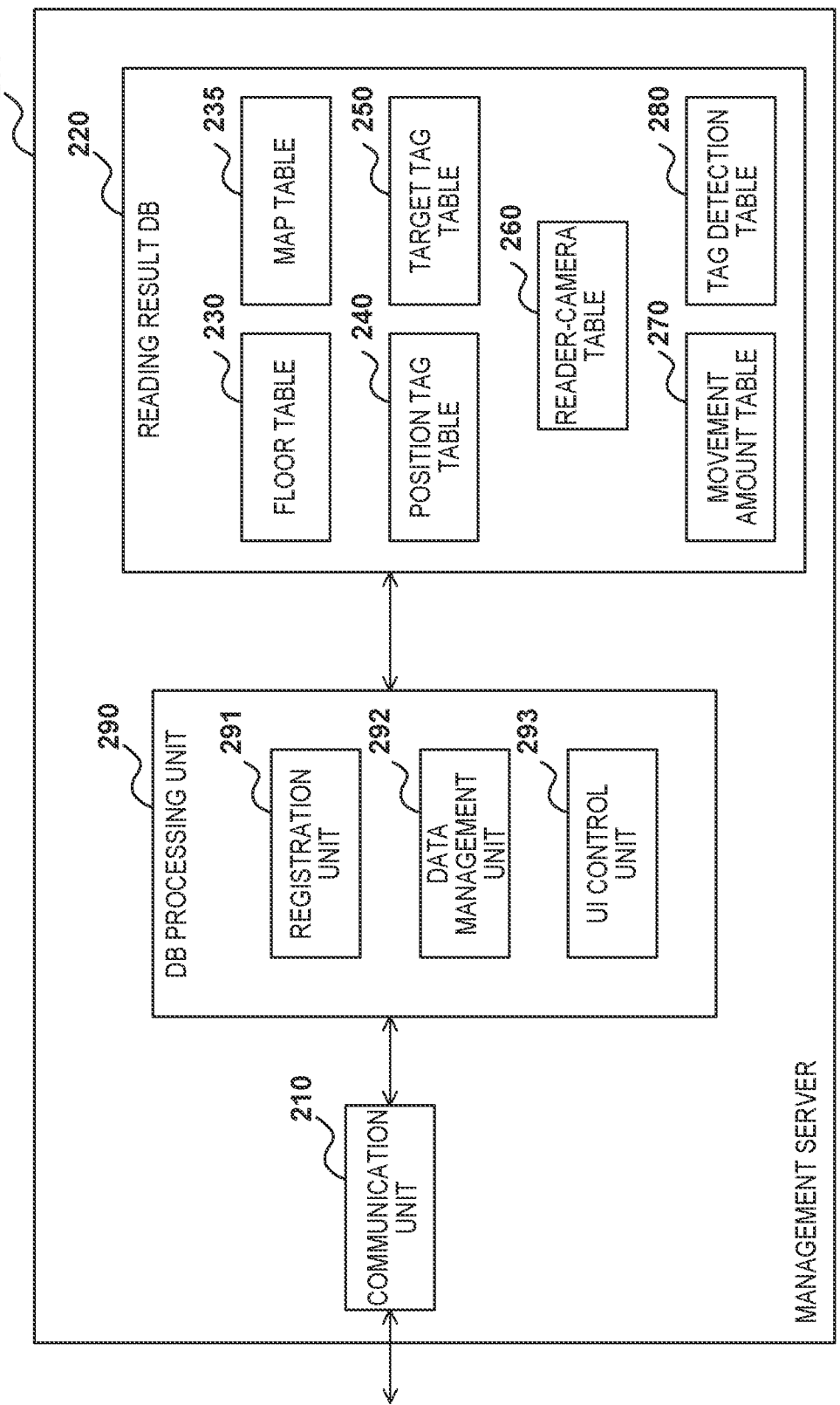

FIG. 6A

| TAG ID | TARGET ID | NAME |
|---|---|---|
| TG2A | IT0A | DEVICE A |
| TG2B | IT0B | DEVICE B |
| TG2C | IT0C | MATERIAL C |
| TG2E | IT0E | WALL E |
| ⋮ | ⋮ | ⋮ |

FIG. 6B

| READER ID | CAMERA ID |
|---|---|
| RD01 | CM01 |
| RD02 | CM02 |
| ⋮ | ⋮ |

FIG. 10A
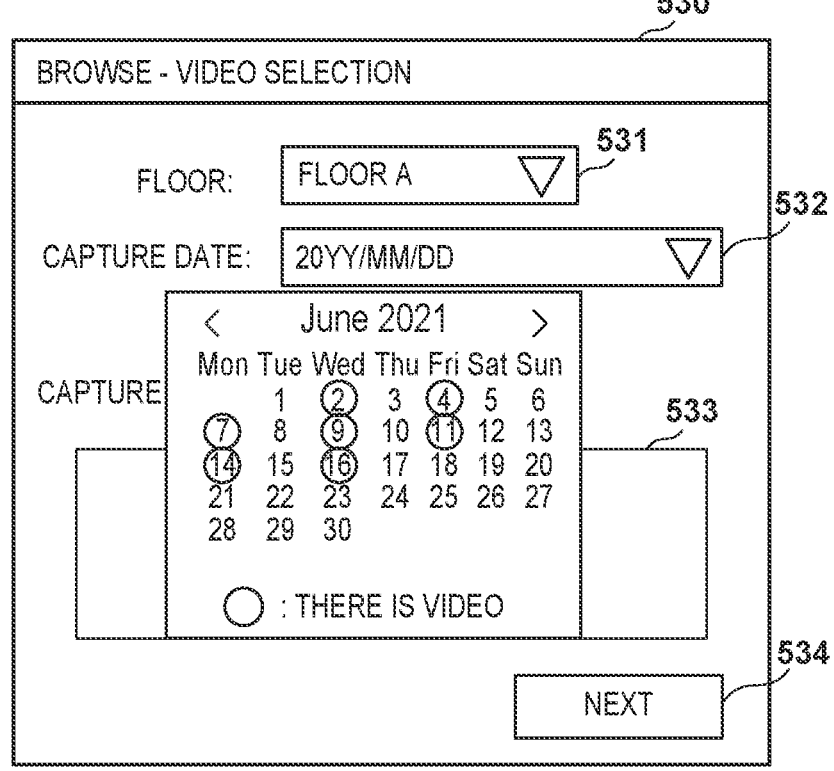
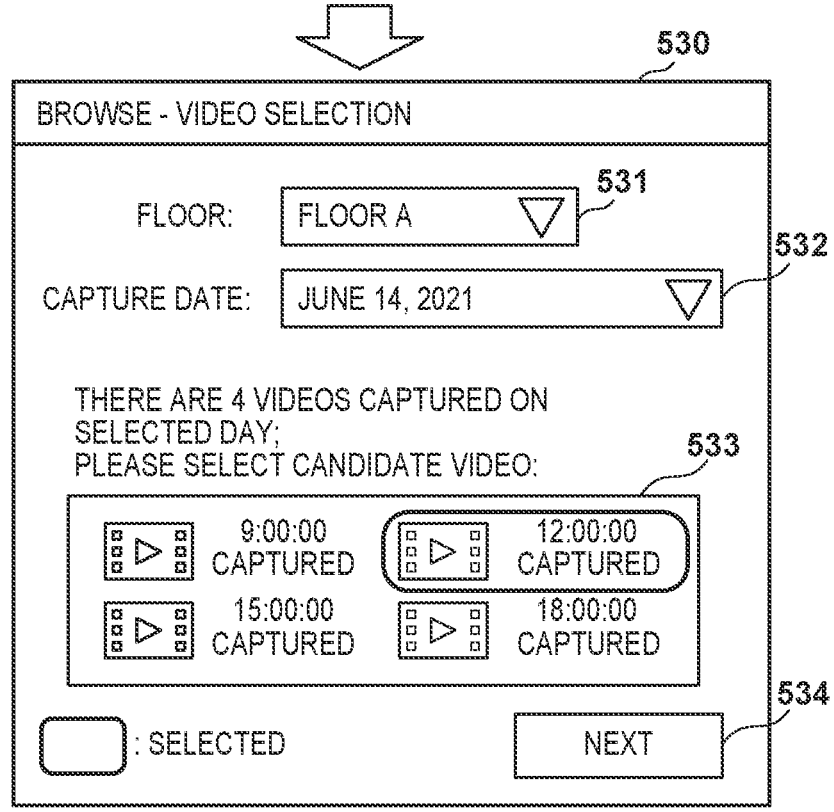

| TAG ID (361) | CAMERA ID (362) | FLOOR ID (363) |
|---|---|---|
| TG3A | CM01 | F03 |
| TG3B | CM02 | F04 |
| ⋮ | ⋮ | ⋮ |

| READER ID (366) | MOVING ENTITY ID (367) | NAME (368) |
|---|---|---|
| RD0C | MV0C | USER C |
| RD0D | MV0D | VEHICLE D |
| ⋮ | ⋮ | ⋮ |

| TAG ID (281) | READING TIME (282) | READER ID (283) | DETECTION POSITION (284) |
|---|---|---|---|
| ⋮ | ⋮ | ⋮ | ⋮ |
| TG3A | T22 | RD0C | (U11, V11) |
| ⋮ | ⋮ | ⋮ | ⋮ |
| TG3A | T28 | RD0D | (U21, V21) |
| ⋮ | ⋮ | ⋮ | ⋮ |

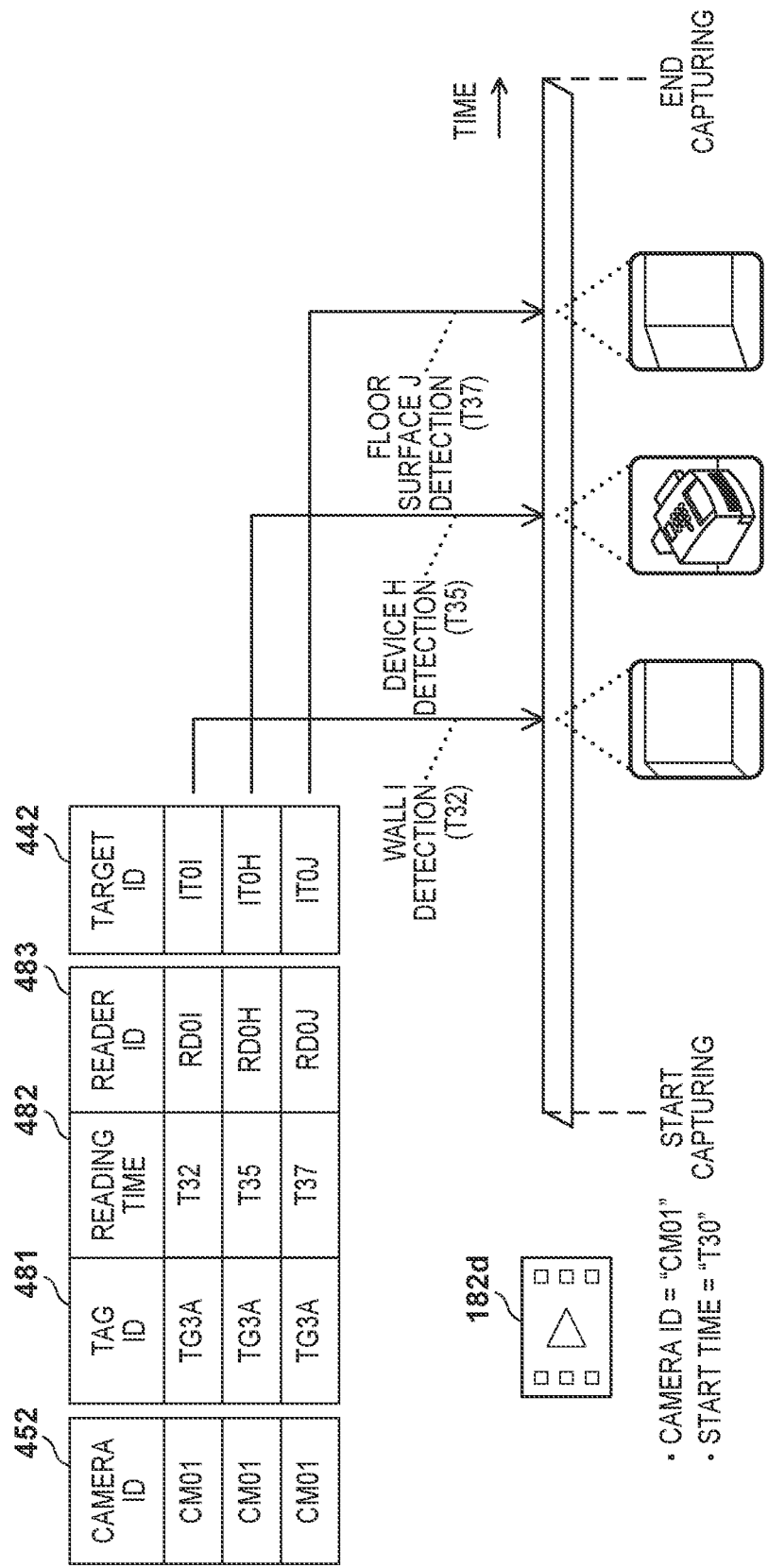

VIDEO MANAGEMENT SYSTEM, VIDEO MANAGEMENT METHOD, READING APPARATUS, AND INFORMATION PROCESSING APPARATUS

CROSS-REFERENCE TO RELATED APPLICATIONS

This application is a Continuation of International Patent Application No. PCT/JP2022/021515, filed May 26, 2022, which claims the benefit of Japanese Patent Application No. 2021-093151, filed Jun. 2, 2021, both of which are hereby incorporated by reference herein in their entirety.

BACKGROUND OF THE INVENTION

Field of the Invention

The present disclosure relates to a video management system, a video management method, a reading apparatus, and an information processing apparatus.

Background Art

In recent years, as a result of enhancement in performance of information communication technology, it has become possible to record videos in various situations. For example, at a building construction site, in order to record how construction progresses on a daily basis, a large number of photographs were conventionally taken and classified by date or by place to store them accordingly, however, video recording has become mainstream, recently. Patent Literature 1 is a prior art related to the former, and Patent Literature 2 is a prior art related to the latter.

Patent Literature 1 proposes causing a display to display a plan of a building construction site in association with capturing positions of photographs in order to reduce mistakes in management of the photographs captured at the construction site. Patent Literature 2 proposes that an operator who wears a 360-degree camera captures a video while patrolling a site, and a system automatically judges work situations through image recognition. Patent Literature 2 also discloses that positioning is performed in parallel with capturing to store position data in association with the captured video.

CITATION LIST

Patent Literature

PTL 1: Japanese Patent Laid-Open No. 2017-107420
PTL 2: Japanese Patent Laid-Open No. 2019-148946

However, it is not easy to find a scene in which a specific target is present within a video in an environment where a situation of management targets changes over time or where items and people move frequently. The difficulty in accessing a desired scene will become significant as there are much more recorded videos. The technique of automatic judgment on a specific target through image recognition will not effectively work unless appearance of the target is known and unchanged.

In light of the foregoing, the present invention aims at providing a mechanism for facilitating an easier access to a scene in which a specific target is present within a video.

SUMMARY OF THE INVENTION

According to an aspect, there is provided a video management system for managing a video of a real space captured by a capturing apparatus, including: a first reading unit configured to emit an electromagnetic wave to a tag reading range and read information that is sent back from an RFID tag utilizing energy of the electromagnetic wave; a first RFID tag that stores first tag identification information; and a data management unit configured to cause a database to store a reading result by the first reading unit in association with the video so that a portion in the video captured by the capturing apparatus corresponding to a time at which the first tag identification information has been read from the first RFID tag by the first reading unit is able to be extracted. A corresponding video management method, a reading apparatus and an information processing apparatus are also provided Further features of the present invention will become apparent from the following description of exemplary embodiments with reference to the attached drawings.

BRIEF DESCRIPTION OF THE DRAWINGS

FIG. 3 is a block diagram illustrating an example of a configuration of a video server according to the first embodiment.

FIG. 4 is a block diagram illustrating an example of a configuration of a management server according to the first embodiment.

FIG. 6A is an explanatory diagram illustrating an example of a configuration of a target table according to the first embodiment.

FIG. 6B is an explanatory diagram illustrating an example of a configuration of a reader-camera table according to the first embodiment.

FIG. 10A is a first explanatory diagram for explaining a second practical example of a UI for scene selection.

FIG. 19A is an explanatory diagram illustrating an example of a configuration of a camera table according to the second embodiment.

FIG. 19B is an explanatory diagram illustrating an example of a configuration of a reader table according to the second embodiment.

FIG. 19C is an explanatory diagram illustrating an example of a configuration of a tag detection table according to the second embodiment.

FIG. 24 is an explanatory diagram for explaining association of tag reading results with a video in the third embodiment.

DESCRIPTION OF THE EMBODIMENTS

Figure 1:
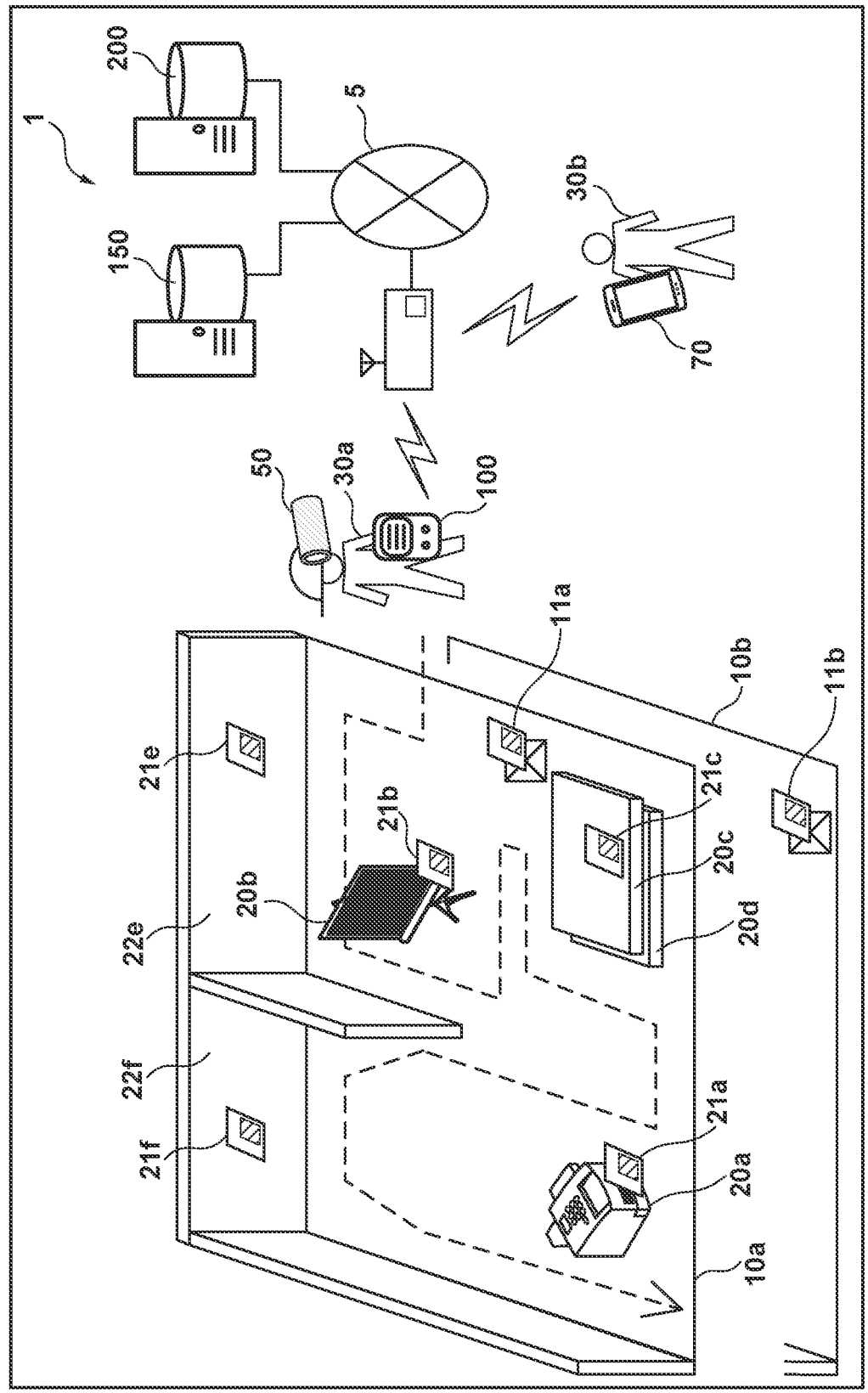
FIG. 1 is a schematic view illustrating an example of a configuration of a video management system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. First Embodiment

<1-1. System Overview>

FIG. 1 is a schematic view illustrating an example of a configuration of a video management system 1 according to a first embodiment. The video management system 1 is a system that manages videos of a real space captured by cameras using a database and allows the videos to be browsed by users.

FIG. 1 illustrates, as an example of a real space, floors 10a and 10b of a building under construction. Construction is ongoing on the floor 10a, and there are items 20a, 20b, 20c and 20d placed on the floor 10a for use in the construction. The items 20a and 20b are devices utilized for work or management thereof. The items 20c and 20d are construction materials.

A user 30a is an operator who is involved in the construction on the floor 10a. The user 30a takes videos with a camera 50 while patrolling within the floor 10a (for example, along the dashed arrow in the figure) regularly. The videos captured by the camera 50 are transmitted to a video server 150, which will be described below, and stored in a database. A user 30b is a manager who is responsible for progress of the construction. The user 30b browses videos stored by the video server 150 using a user terminal 70 and checks the progress of the construction. The users 30a and 30b may be the same person or different persons.

When the user 30b browses videos captured on the floor 10a, there may be a need to check a scene in which a specific target is present. For example, the user 30b browses a captured video in order to check where specific device is arranged at, whether a specific material has been used in a correct procedure, whether a work for a specific section has been completed on schedule, and so on. However, a situation on the floor 10a changes over time, and items and persons move frequently. As such, it is not easy to find a scene in which a specific target is present from among a large number of videos taken in the past. Hence, radio frequency identification (RFID) tags are introduced in the present embodiment. An RFID tag is attached to each of one or more management targets. In the present specification, 'management targets' refers to objects selected in advance considering a management purpose out of objects that may be present in a video under management of the system. For example, some of the above-described items may be selected as management targets, and RFID tags may be attached to those items. They are not limited to movable items, and fixed items such as ceilings, floors or walls may also be selected as management targets. Moreover, a certain section in a real space may be selected as a management target, and an RFID tag may be attached at an arbitrary position in that section.

In the example of FIG. 1, RFID tags 21a, 21b and 21c are attached to the items 20a, 20b and 20c, respectively. There is also an RFID tag 21e attached on a wall 22e, and an RFID tag 21f on a wall 22f. The user 30a wears a helmet equipped with the camera 50 and carries a tag reader 100 to patrol within the floor 10a. In the meantime, the camera 50 captures a video, and the tag reader 100 attempts to read information from each RFID tag. Then, the result of reading of information from each RFID tag by the tag reader 100 is stored in a database in association with the video captured by the camera 50, whereby it is made possible to extract a scene corresponding to each reading time from the video.

Furthermore, in the example of FIG. 1, there is an RFID tag 11a installed on the floor 10a, and an RFID tag 11b on the floor 10b. The positions of these RFID tags 11a, 11b are known in advance, and may be treated as reference positions when estimating the position of the tag reader 100 as described below in detail. In this specification, these RFID tags 11a, 11b are referred to as position tags. In addition, a RFID tag attached to each management target is referred to as a target tag.

Note that, in the following descriptions, the items 20a, 20b, . . . are collectively referred to as items 20 by omitting the trailing alphabets from the reference signs when they do not need to be distinguished from each other. The same applies to the floors 10a, 10b, . . . (floor 10), the position tags 11a, 11b, . . . (position tags 11), the target tags 21a, 21b, . . . (target tags 21), and the users 30a, 30b, . . . (user 30), as well as any other constituent elements.

<1-2. Overall System Configuration>

The video management system 1 includes, in addition to the above-described position tags 11 and the target tags 21, a camera 50, a user terminal 70, a tag reader 100, a video server 150, and a management server 200. The user terminal 70, the tag reader 100, the video server 150, and the management server 200 are connected to each other via a network 5. The network 5 may be a wired network, a wireless network, or any combination thereof. Examples of the network 5 may include the Internet, an intranet, and a cloud network.

In the present embodiment, each of the position tags 11 and the target tags 21 is a kind of a wireless device and is assumed to be, in particular, a passive-type RFID tag (a passive tag). A passive tag is composed of: a small integrated circuit (IC) chip with an embedded memory; and an antenna, and has identification information for identifying the tag and some other information stored in the memory. In this specification, identification information is simply referred to as an ID, and identification information for identifying a tag is referred to as a tag ID. The IC chip of a passive tag operates by utilizing energy of an electromagnetic wave emitted from a tag reader, and modulates the information stored in the memory into an information signal to transmit (send back) the information signal from the antenna.

The camera 50 is a capturing apparatus that captures videos to record them. The camera 50 may transmit captured videos to the video server 150 in real-time. Alternatively, the camera 50 may accumulate video data in an internal memory. In the latter case, the video data accumulated in the memory may be uploaded from the camera 50 to the video server 150 later on. In the present embodiment, the camera prestores camera identification information (also referred to as a camera ID) which uniquely identifies the local apparatus. The video captured by the camera 50 may be identified by a combination of the camera ID and a capturing time. The camera 50 may add the camera ID and a capturing time to video data representing each video to transmit it to the video server 150. Note that the camera 50 may be capable of capturing not only videos but also still images. Though the camera 50 is attached to the helmet worn by the user 30a in the example of FIG. 1, the camera 50 may be carried by the user 30a.

The user terminal 70 is a terminal apparatus that is utilized by a user 30 of the video management system 1. The user terminal 70 may be, for example, a general-purpose terminal such as a personal computer (PC), a smartphone, or a mobile phone, or a dedicated terminal specialized for a video management purpose. The user terminal 70 typically includes a processor and a memory, an input device that receives user inputs, a communication interface that communicates with other apparatuses, and a display device that displays videos and information. As an example, the user terminal 70 is utilized by the user 30b when he or she browses a video. Examples of user interactions that may be performed via the user terminal 70 in connection with browsing videos will further be described below.

The tag reader 100 is a reading apparatus that reads information from the RFID tags. The tag reader 100 is typically carried by a user and moves within a floor 10. The tag reader 100 attempts tag reading periodically, and transmits a tag reading result to the management server 200. In addition, in the present embodiment, the tag reader 100 is capable of measuring a relative amount of movement in a real space. The tag reader 100 may be capable of communicating with the management server 200 directly or indirectly via a certain relay apparatus. An example of a particular configuration of the tag reader 100 will be further described below.

It should be noted that, though FIG. 1 depicts the camera 50 and the tag reader 100 as physically separate apparatuses, there may be provided an integrated apparatus that has both functionalities of the camera 50 and the tag reader 100. The camera 50 may be equipped with a tag reading function and, alternatively, the tag reader 100 may be equipped with a video-capturing function. Moreover, instead of the user 30a wearing or carrying the camera 50 and the tag reader 100, the camera 50 and the tag reader 100 (or an integrated apparatus) may move in a real space while being mounted on a movable machine (for example, a drone, a vehicle or a robot). In the present specification, users 30 or such movable machines may also be referred to as moving entities.

The video server 150 is an information processing apparatus that has a database in which videos captured by the camera 50 are stored and accumulated. The management server 200 is an information processing apparatus that has a database which stores the results of tag reading by the tag reader 100 from position tags 11 and target tags 21. The video server 150 and the management server 200 may be implemented as an application server, a database server, or a cloud server by using a high-end general-purpose computer, for example. Examples of particular configurations of the video server 150 and the management server 200 will be further described below.

The management functions of the management server 200, which will be described in detail below, may be provided by a single apparatus or by physically-separate multiple apparatuses which operate in conjunction with each other. The same applies to the video storage functions of the video server 150. The video server 150 and the management server 200 may be realized as an integrated single server apparatus. Moreover, a part of the database described below may be maintained by an apparatus (for example, the camera 50 or the tag reader 100) that is separate from the video server 150 and the management server 200.

<1-3. Configuration Example of Tag Reader>

Figure 2:
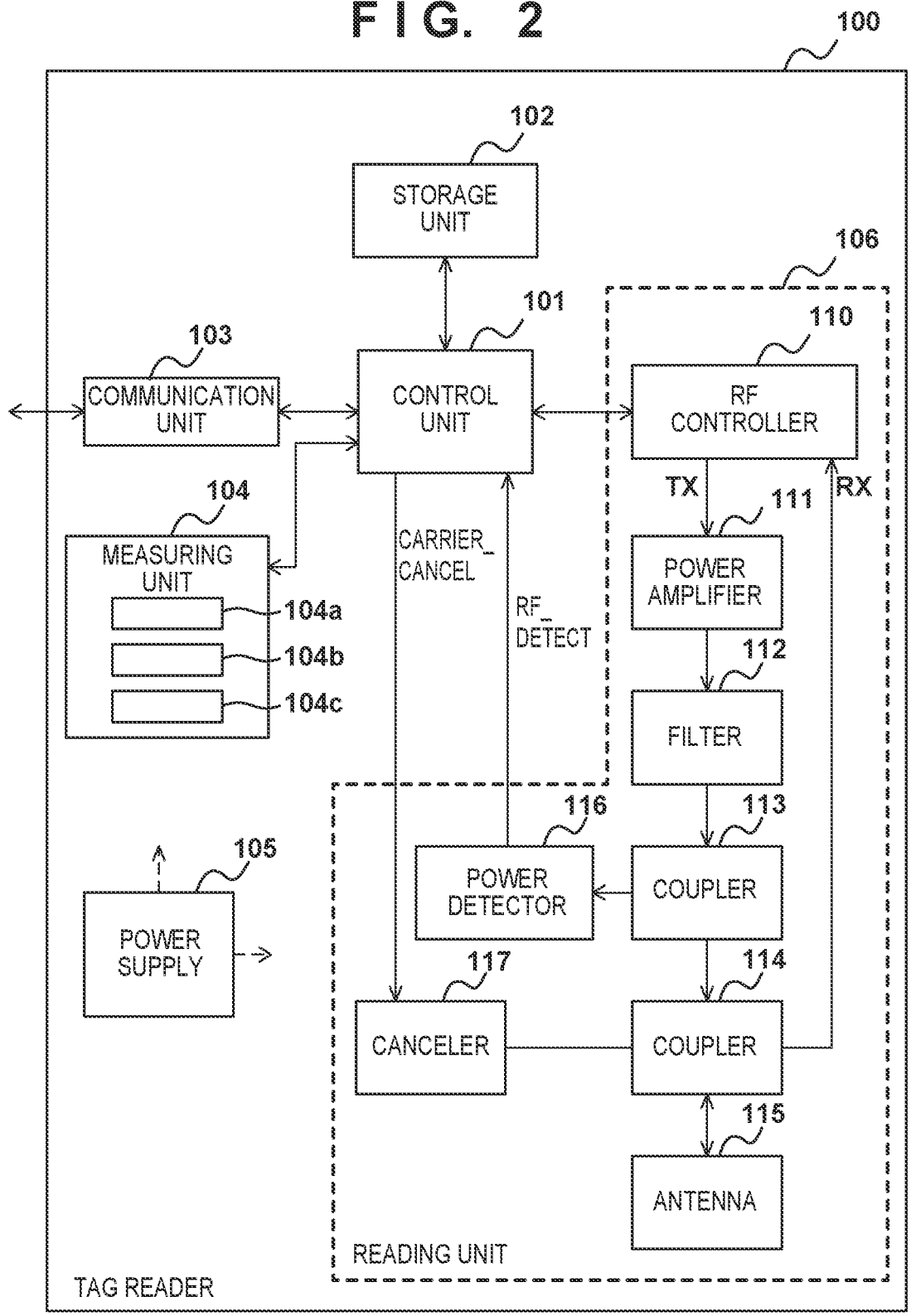
FIG. 2 is a block diagram illustrating an example of a configuration of a tag reader according to the first embodiment.

FIG. 2 is a block diagram illustrating an example of a configuration of the tag reader 100 according to the first embodiment. Referring to FIG. 2, the tag reader 100 includes a control unit 101, a storage unit 102, a communication unit 103, a measuring unit 104, a power supply 105, and a reading unit 106.

The control unit 101 consists of a memory to store computer programs, and one or more processors (for example, central processing units (CPUs)) to execute the computer programs. The control unit 101 controls overall functionality of the tag reader 100 described in this specification. For example, the control unit 101 causes the reading unit 106 to perform reading from an RFID tag within a tag reading range, and causes the storage unit 102 to store the read information and the time of the reading as reading result data. In parallel to the reading from RFID tags, the control unit 101 also causes the measuring unit 104 to measure an amount of movement of the tag reader 100, and the storage unit 102 to store, as measurement result data, movement amount information indicating the measurement result and a measurement time. Then, the control unit 101 transmits, to the management server 200 via the communication unit 103, the reading result data and the measurement result data stored in the storage unit 102 together with the reader identification information (also referred to as a reader ID) of the tag reader 100.

The storage unit 102 may include any kind of storage medium such as a semiconductor memory (a read only memory (ROM), a random access memory (RAM), or the like), an optical disk, or a magnetic disk, for example. In the present embodiment, the storage unit 102 stores the above-described reading result data, measurement result data, and the reader ID of the tag reader 100.

The communication unit 103 is a communication interface for the tag reader 100 to communicate with the management server 200. For example, the communication unit 103 may be a wireless local area network (WLAN) interface that communicates with a WLAN access point, or a cellular communication interface that communicates with a cellular base station. Alternatively, the communication unit 103 may be a connection interface (e.g. a Bluetooth (registered trademark) interface or a universal serial bus (USB) interface) for connection with a relay apparatus.

The measuring unit 104 is a measuring means that measures an amount of relative movement of the tag reader 100 to output the measured amount of movement to the control unit 101. For example, the measuring unit 104 includes a three-axis acceleration sensor 104a, a gyro sensor 104b, and a geomagnetic sensor 104c. The three-axis acceleration sensor 104a measures acceleration applied to the tag reader 100 in the device coordinate system that is specific to the tag reader 100, and outputs first sensor data. The gyro sensor 104b measures an angular speed of the tag reader 100, that is, a change in attitude of the tag reader, to output second sensor data. The geomagnetic sensor 104c measures an orientation of the tag reader 100 in the real space to output third sensor data. The measuring unit 104 can measure the amount of relative movement of the tag reader 100 based on these pieces of sensor data by converting the direction of the acceleration of the tag reader 100 into a direction in a coordinate system of the real space to integrate the converted acceleration. The measurement of an amount of movement here may be performed in accordance with any publicly-known self-localization technique (also referred to as pedestrian dead reckoning (PDR)). The amount of relative movement output from the measuring unit 104 to the control unit 101 may be a two-dimensional vector in a surface of a floor 10, or a three-dimensional vector that includes a component of height direction as well. The starting point of measurement of the amount of relative movement may be, for example, the position of the tag reader 100 at the time when the tag reader 100 is activated.

It should be noted that, though FIG. 2 illustrates an example where the tag reader 100 includes the measuring unit 104, the measuring unit 104 may be included in an external device that is capable of communicating with the tag reader 100 and is carried by the user along with the tag reader 100. In that case, the tag reader 100 receives, from the external device, movement amount information indicating a relative amount of movement measured by the measuring unit 104.

The power supply 105 includes a battery and a DC-DC converter, and supplies power for operating electronic circuits of the control unit 101, the storage unit 102, the communication unit 103, the measuring unit 104 and the reading unit 106 of the tag reader 100. The battery may include a primary cell, or a rechargeable secondary cell. Although not illustrated in the figure, the tag reader 100 may have a connection terminal for connecting the tag reader 100 to an external power source for recharging the power supply 105.

The reading unit 106 is a reading means that is capable of reading, from each of the position tags 11 and the target tags 21, identification information stored in the tag. Referring to FIG. 2, the reading unit 106 includes an RF controller 110, a power amplifier 111, a filter 112, a first coupler 113, a second coupler 114, an antenna 115, a power detector 116, and a canceler 117. The RF controller 110 outputs a transmission signal (for example, a signal modulated in the UHF band) from a TX terminal to the power amplifier 111 in accordance with control by the control unit 101. The power amplifier 111 amplifies the transmission signal input from the RF controller 110 to output it to the filter 112. The filter 112 may be a low-pass filter, for example, and filters out unnecessary frequency components from the transmission signal amplified by the power amplifier 111. The first coupler 113 distributes the transmission signal that has passed the filter 112 to the coupler 114 and the power detector 116. The second coupler 114 outputs the transmission signal input from the first coupler 113 to the antenna 115, and outputs a received signal input from the antenna 115 to the RF controller 110. The antenna 115 transmits the transmission signal input from the coupler 114 to the air as an electromagnetic wave. Further, the antenna 115 receives a signal that has been sent back from an RFID tag that exists within the reading range of the tag reader 100 in response to the transmission signal, and outputs the received signal to the coupler 114. The power detector 116 detects a power level of the signal input from the first coupler 113, and outputs a signal 'RF_DETECT' indicative of the detected power level to the control unit 101. The canceler 117 receives a signal 'CARRIER_CANCEL' indicative of a power level of a carrier from the control unit 101. Then, the canceler 117 extracts an intended signal component of the received signal to be output to an RX terminal of the RF controller 110 by canceling the carrier component of the transmission signal based on the CARRIER_CANCEL. The RF controller 110 demodulates the signal input from the RX terminal to obtain the tag ID and other information sent back from the RFID tag, and outputs the obtained information to the control unit 101.

In the present embodiment, the reading unit 106 can attempt tag reading periodically (for example, once per second) without requiring any explicit command from a user. Data transmission from the communication unit 103 to the management server 200 can also be performed periodically (for example, every few seconds) or whenever the tag reading is done or the measurement of relative movement is done without requiring any explicit command from a user. The control unit 101 may exclude, from the data to be transmitted, the same record as the most recent record that has already been transmitted in a predetermined time period to omit redundant data transmission and reduce a communication load. It should be noted that, in another embodiment, one or both of an attempt of tag reading by the reading unit 106 and data transmission to the management server 200 may be performed in response to a user input via a certain user interface arranged in the tag reader 100. In a case where the communication unit 103 performs communication with the management server 200 indirectly via a relay apparatus, the data transmission to the management server 200 may be performed only while there is an effective connection between the communication unit 103 and the relay apparatus.

<1-4. Configuration Example of Video Server>

FIG. 3 is a block diagram illustrating an example of a configuration of the video server 150 according to the first embodiment. Referring to FIG. 3, the video server 150 includes a communication unit 160, a video management unit 170, a video database (DB) 180, and a reproduction control unit 190.

The communication unit 160 is a communication interface for the video server 150 to communicate with other apparatuses. The communication unit 160 may be a wired communication interface or a wireless communication interface. In the present embodiment, the communication unit 160 receives video data representing a video captured by the camera 50 over the network 5. The communication unit 160 then outputs the received video data to the video management unit 170. Additionally, upon receiving a reproduction request from the user terminal 70, the communication unit 160 outputs the received reproduction request to the reproduction control unit 190. The communication unit 160 then sequentially transmits (e.g., streams), to the user terminal 70, packets of a video that is reproduced by the reproduction control unit 190.

The video management unit 170 is a software module that provides a management function for managing video data accumulated in the video DB 180. The software module may operate by executing computer programs stored in a memory (not shown) by one or more processors (not shown) of the video server 150. The same applies to the reproduction control unit 190, which will be described below.

For example, when video data is received via the communication unit 160, the video management unit 170 stores the video data in the video DB 180. In the example in FIG. 3, data of a plurality of videos, including video data 181a and 181b, has been accumulated in the video DB 180. The video data 181a and 181b include video information, such as the camera ID that identifies the apparatus that captured the video and the capture time, as well as video files 182a and 182b that include the actual video, respectively. The capture time may include a capture start time and a capture end time, or may include a capture start time (or a capture end time) and a time length. When a video information request designating some kind of search condition is received, the video management unit 170 may search the video DB, extract the video information of one or more videos that meet the designated search condition, and return the extracted video information to the requesting apparatus.

The reproduction control unit 190 is a software module that reproduces a video stored in the video DB 180 (or reproduces a still image extracted from a video). For example, the reproduction control unit 190 receives a reproduction request from the user terminal 70 via the communication unit 160. The reproduction request can include information designating a scene to be reproduced (e.g., a length of time from the capture start time), in addition to information identifying the video to be reproduced (e.g., the camera ID and the capture start time). In response to such a reproduction request being received, the reproduction control unit 190 extracts the scene to be reproduced from the video data 181 of the designated video. The reproduction control unit 190 then sequentially transmits the video packets of the extracted scene to the user terminal 70 via the communication unit 160.

Note that in the present specification, 'scene' refers to a portion of a video. The scene may be a portion of the video constituted by one or more frames, or may be a still image. If the reproduction request is a request to reproduce a still image, the reproduction control unit 190 may transmit image data of the still image extracted from the video data 181 to the user terminal 70 via the communication unit 160, instead of video packets.

<1-5. Configuration Example of Management Server>
<1-5-1. Basic Configuration>

FIG. 4 is a block diagram illustrating an example of a configuration of the management server 200 according to the first embodiment. Referring to FIG. 4, the management server 200 includes a communication unit 210, a reading result DB 220, and a DB processing unit 290.

The communication unit 210 is a communication interface for the management server 200 to communicate with other apparatuses. The communication unit 210 may be a wired communication interface or a wireless communication interface. The reading result DB 220 is constituted by tables for managing data indicating results of tag reading performed by the tag reader 100. In the present embodiment, the reading result DB 220 includes a floor table 230, a map table 235, a position tag table 240, a target tag table 250, a reader-camera table 260, a movement amount table 270, and a tag detection table 280. The DB processing unit 290 is a collection of a plurality of software modules that provide functions for controlling storage of the tag reading results by the reading result DB 220 and display of videos based on the tag reading results. The individual software modules may operate by executing computer programs stored in a memory (not shown) by one or more processors (not shown) of the management server 200. Here, the memory may include a non-transitory computer-readable storage medium. In the present embodiment, the DB processing unit 290 includes a registration unit 291, a data management unit 292, and a user interface (UI) control unit 293.

<1-5-2. Data Configuration Examples>

Figure 5A:
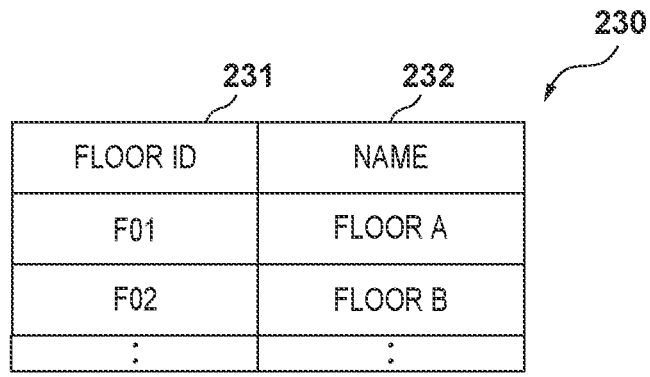
FIG. 5A is an explanatory diagram illustrating an example of a configuration of a floor table according to the first embodiment.
Figure 5B:
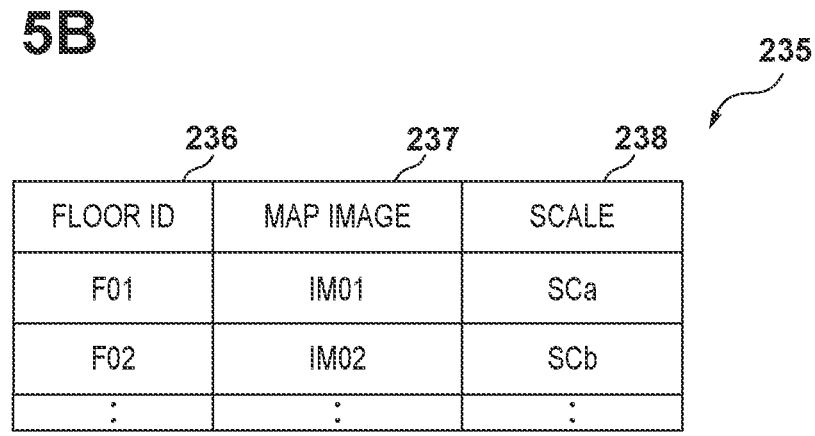
FIG. 5B is an explanatory diagram illustrating an example of a configuration of a map table according to the first embodiment.
Figure 5C:
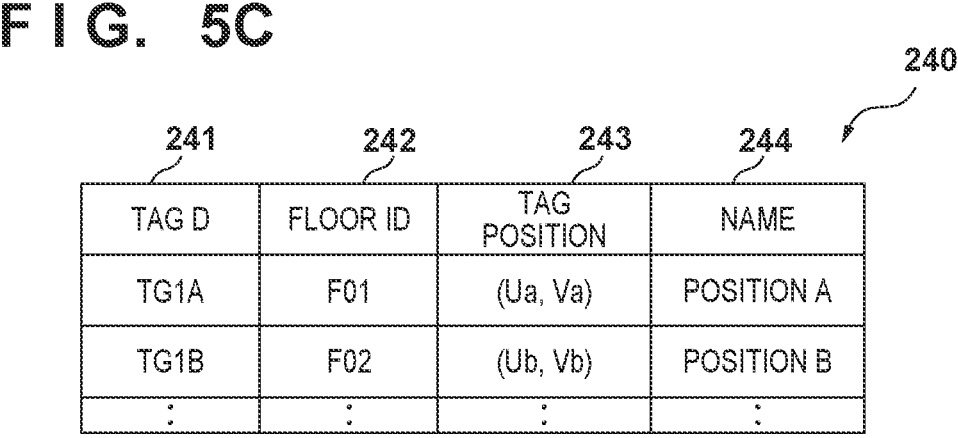
FIG. 5C is an explanatory diagram illustrating an example of a configuration of a position table according the first embodiment.
Figure 7A:
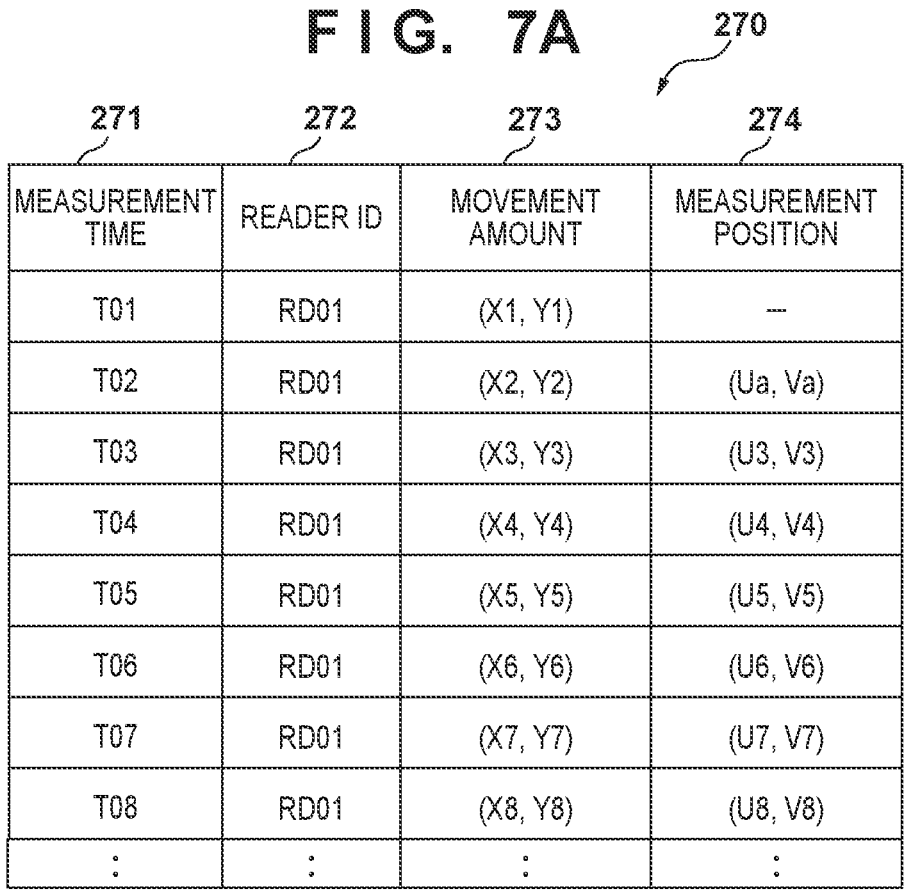
FIG. 7A is an explanatory diagram illustrating an example of a configuration of a movement amount table according to the first embodiment.
Figure 7B:
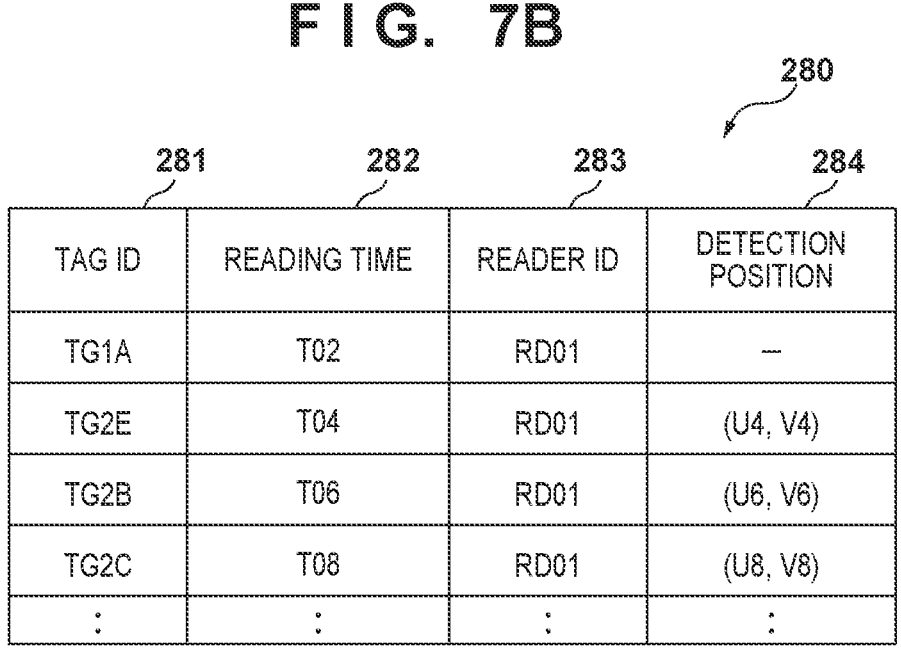
FIG. 7B is an explanatory diagram illustrating an example of a configuration of a tag detection table according to the first embodiment.

FIGS. 5A to 5C illustrate respective configuration examples of the floor table 230, the map table 235, and the position tag table 240 of the reading result DB 220. FIGS. 6A and 6B illustrate respective configuration examples of the target tag table 250 and the reader-camera table 260 of the reading result DB 220. FIGS. 7A and 7B illustrate respective configuration examples of the movement amount table 270 and the tag detection table 280 of the reading result DB 220.

The floor table 230 has two data elements, namely Floor ID 231 and Name 232. Floor ID 231 is identification information that uniquely identifies each floor. Name 232 represents a name of each floor. In the example of FIG. 5A, the name of the floor identified by Floor ID 'F01' is 'Floor A', and the name of the floor identified by Floor ID 'F02' is 'Floor B'. Note that 'Floor A' and 'Floor B' may be, in practice, names such as '1st floor, ABC building construction site' and '2nd floor, ABC building construction site', for example.

The map table 235 has three data elements, namely Floor ID 236, Map Image 237, and Scale 238. Floor ID 236 indicates the floor 10 to be associated with a map image in the map table 235, using a value of Floor ID 231 in the floor table 230. Map Image 237 is a data element storing map information representing a map of the floor 10 identified by Floor ID 236. Here, typically, the map information may be image information. Scale 238 indicates a ratio for converting a distance on a map in Map Image 237 into a distance in real space (e.g., how many meters in real space correspond to a single pixel in the image). Note that the map information stored in Map Image 237 may be obtained from an external data source, or uploaded by a user and updated, at required timings.

The position tag table 240 has four data elements, namely Tag ID 241, Floor ID 242, Tag Position 243, and Name 244. Tag ID 241 is identification information that uniquely identifies each of the position tags 11. The value of Tag ID 241 is the same as the value of the tag ID stored in the corresponding position tag 11. Floor ID 242 indicates the floor 10 where each position tag 11 is installed, using a value of Floor ID 231 in the floor table 230. In the example in FIG. 5C, the position tag 11a identified by a tag ID "TG1A" is installed on the floor 10a identified by a floor ID "F01", and a position tag 11b identified by a tag ID "TG1B" is installed on the floor 10b identified by a floor ID "F02". Tag Position 243 indicates position coordinates representing the position in the real space where each position tag 11 is installed. Here, the position coordinates may be expressed in a coordinate system of the map information stored in Map Image 237, and in this case, Scale 238 can be used to perform conversions back and forth between coordinate values on the map and coordinate values in a corresponding real space. Name 244 indicates a name of the position where each position tag 11 is installed. In the example in FIG. 5C, Name 244 of each of the two position tags 11 identified by the tag IDs "TG1A" and "TG1B" are "Position A" and "Position B", respectively.

The target tag table 250 has three data elements, namely Tag ID 251, Target ID 252, and Name 253. Tag ID 251 is identification information that uniquely identifies the target tag 21 attached to each of the management targets. The value of Tag ID 251 is the same as the value of the tag ID stored in the corresponding target tag 21. Target ID 252 is identification information that uniquely identifies each management target. Name 253 indicates a name of each management target. In the example in FIG. 6A, the name of the management target identified by the tag ID "TG2A" or the target ID "IT0A" is "Device A". The name of the management target identified by the tag ID "TG2B" or the target ID "IT0B" is "Device B". The name of the management target identified by the tag ID "TG2C" or the target ID "IT0C" is "Material C". The name of the management target identified by the tag ID "TG2E" or the target ID "IT0E" is "Wall E".

The reader-camera table 260 is a table that holds an association between a reader ID of a reading apparatus that reads tags and a camera ID of a capturing apparatus that captures images in parallel with the reading. The reader-camera table 260 has two data elements, namely Reader ID 261 and Camera ID 262. In the example in FIG. 6B, the first record in the reader-camera table 260 indicates that the tag reader identified by the reader ID "RD01" is associated with the camera identified by the camera ID "CM01". The second record indicates that the tag reader identified by the reader ID "RD02" is associated with the camera identified by the camera ID "CM02".

The movement amount table 270 is a table for accumulating records of measurement result data received from the tag reader 100 (called "measurement result records" hereinafter). The movement amount table 270 has four data elements, namely Measurement Time 271, Reader ID 272, Movement Amount 273, and Measurement Position 274. Measurement Time 271 indicates the time at which the measurement has been performed with respect to the measurement result indicated by the corresponding measurement result record. Reader ID 272 is identification information that identifies the tag reader 100 that performed the measurement with respect to the measurement result indicated by the corresponding measurement result record. In the example in FIG. 7A, the eight records in the movement amount table 270 indicate the results of the movement amount measurement performed by the same tag reader 100 identified by a reader ID "RD01" at eight different times, namely "T01" to "T08". Movement Amount 273 indicates a relative amount of movement of the tag reader 100 as a measurement result. The relative amount of movement may be expressed, for example, in the form of a two-dimensional vector in a real space coordinate system. Measurement Position 274 is position information indicating where in the real space (the floor 10) the apparatus that performed the measurement with respect to the measurement result indicated by the corresponding measurement result record was located. Measurement Position 274 may also be a two-dimensional coordinate value. Measurement Position 274 may be derived based on the relative amount of movement from the position at which the tag ID was read from the position tag 11 by the tag reader 100 and the position coordinates of that position tag 11. Measurement Position 274 in the measurement result record for the measurement result data received before the position tag 11 is detected may be blank, or may be updated retroactively after the position tag 11 is detected.

The tag detection table 280 is a table for accumulating records of reading result data received from the tag reader 100 (called "reading result records" hereinafter). The tag detection table 280 has four data elements, namely Tag ID 281, Reading Time 282, Reader ID 283, and Detection Position 284. Tag ID 281 indicates a tag ID that has been read for the corresponding reading result record. Reading Time 282 indicates the time at which the tag ID indicated by Tag ID 281 has been read. Reader ID 283 is identification information that identifies the apparatus that has read the tag with respect to the reading result indicated by the corresponding reading result record. In the example in FIG. 7B, the first record in the tag detection table 280 indicates that the tag reader 100 identified by the reader ID "RD01" read a tag ID "TG1A" at time "T02". Similarly, the second to fourth records indicate that the same tag reader 100 read tag IDs "TG2E", "TG2B", and "TG2C" at times "T04", "T06", and "T08", respectively. Detection Position 284 is position information indicating the position in the real space where the reading apparatus was located at the point in time at which the tag was read from the target tag 21 (i.e., at the point in time at which the target tag 21 was detected). In the example in FIG. 7B, it can be seen from the second record in the tag detection table 280 that Wall E identified by tag ID "TG2E" was located at the position (U4, V4) at the point in time when the tag was read. Similarly, from the third and fourth records, it can be seen that Device B identified by tag ID "TG2B" was located at the position (U6, V6), and Material C identified by tag ID "TG2C" was located at the position (U8, V8). The value of Detection Position 284 can be copied by the data management unit 292 (described below), from Measurement Position 274 in the movement amount table 270, based on the correlation between Measurement Time 271 and Reading Time 282.

<1-5-3. Data Registration>

The contents of the floor table 230, the map table 235, the position tag table 240, and the target tag table 250 may be determined in advance by a user. The registration unit 291 accepts inputs of determined contents of the tables, and registers the respective contents in the corresponding tables.

The association between the reader ID and the camera ID in the reader-camera table 260 may also be determined and registered in advance by a user. Alternatively, in one alteration example, the association between the reader ID and the camera ID may be recognized dynamically when an attempt is made to read the tag. For example, a third type of RFID tag different from the position tag 11 and the target tag 21 (called a "camera tag" hereinafter) is attached to the camera 50. The tag reader 100 reads identification information (the tag ID or the camera ID) from the camera tag, and transmits the reading result data to the management server 200 together with the reader ID of the tag reader 100 itself. If the received reading result data includes the reading result for the camera tag, the registration unit 291 may register, in the reader-camera table 260, an association between the reader ID of the tag reader 100 from which the reading result data was transmitted and the camera ID indicated by the reading result. In this alteration example, the reader-camera table 260 may include an additional data element indicating a validity period of each association (e.g., from the time the camera tag is detected to the time the reading attempt ends). According to such an alteration example, results of tag reading can be associated with videos taken and recorded each day while flexibly changing associations among the apparatuses. For example, even in a case where the camera 50 is replaced with another camera or a plurality of users share the camera 50 to respond to needs at the site, the users do not bear the burden of performing tasks such as registering data for changing the associations.

<1-5-4. Tag Detection>

The data management unit 292 adds one or more records of measurement result data received from the tag reader 100 via the communication unit 210 to the movement amount table 270. As described above, the measurement result data includes movement amount information indicating a relative amount of movement of the tag reader 100 measured by the measuring unit 104 of the tag reader 100. The data management unit 292 can derive an absolute position of the tag reader 100 based on the relative amount of movement indicated by this movement amount information and the known position coordinates of the position tag 11 (indicated in the position tag table 240) whose tag ID was read by the tag reader 100. For example, assuming the position coordinates of the position tag 11 are $(U_0, V_0)$, the relative amount of movement at the point in time when the position tag 11 is detected is $(X_0, Y_0)$, and the latest relative amount of movement is $(X, Y)$, the position coordinates $(U, V)$ of the latest absolute position may be derived according to the following formula:

$$(U,V)=(U_0+(X-X_0), V_0+(Y-Y_0))$$

The data management unit 292 adds the position coordinates indicating the absolute position of the tag reader 100 derived in this manner to the column of Measurement Position 274 in the movement amount table 270.

The data management unit 292 also adds one or more records of the reading result data received from the tag reader 100 to the tag detection table 280. As described above, the reading result data includes the tag ID (and other information) of the RFID tag read by the reading unit 106 of the tag reader 100. Here, the RFID tag is either the position tag 11 or the target tag 21 (in the alteration example described above, the camera tag can also be detected). For each reading result record for the target tag 21, the data management unit 292 extracts, from the movement amount table 270, the measurement result record having the closest measurement time to the reading time indicated by the record (and which has been received from the same tag reader 100). The data management unit 292 then adds the value of Measurement Position 274 indicated by the extracted measurement result record to the column of Detection Position 284 in the corresponding reading result record. As a result, the value of Detection Position 284 in the tag detection table 280 indicates an estimated position, in real space, for each management target to which the target tag 21 detected by the tag reader 100 is attached. The estimation error is, at most, approximately equal to the reading range of the tag reader 100.

In the present embodiment, adding the tag ID and the reading time thereof which have been read from the target tag 21 by the tag reader 100 to the tag detection table 280 along with the reader ID means associating that reading result with a video captured by the camera 50. This is because converting the reader ID of the reading result record to the camera ID according to the association in the reader-camera table 260 makes it possible to access the scene of the corresponding video in the video DB 180 based on the combination of the camera ID and the reading time. In this manner, the data management unit 292 causes the reading result from the tag reader 100 to be stored in the reading result DB 220 in association with at video captured by the camera 50 so that a portion in the video corresponding to the reading time of the tag ID from the target tag 21 is able to be extracted.

Figure 8:
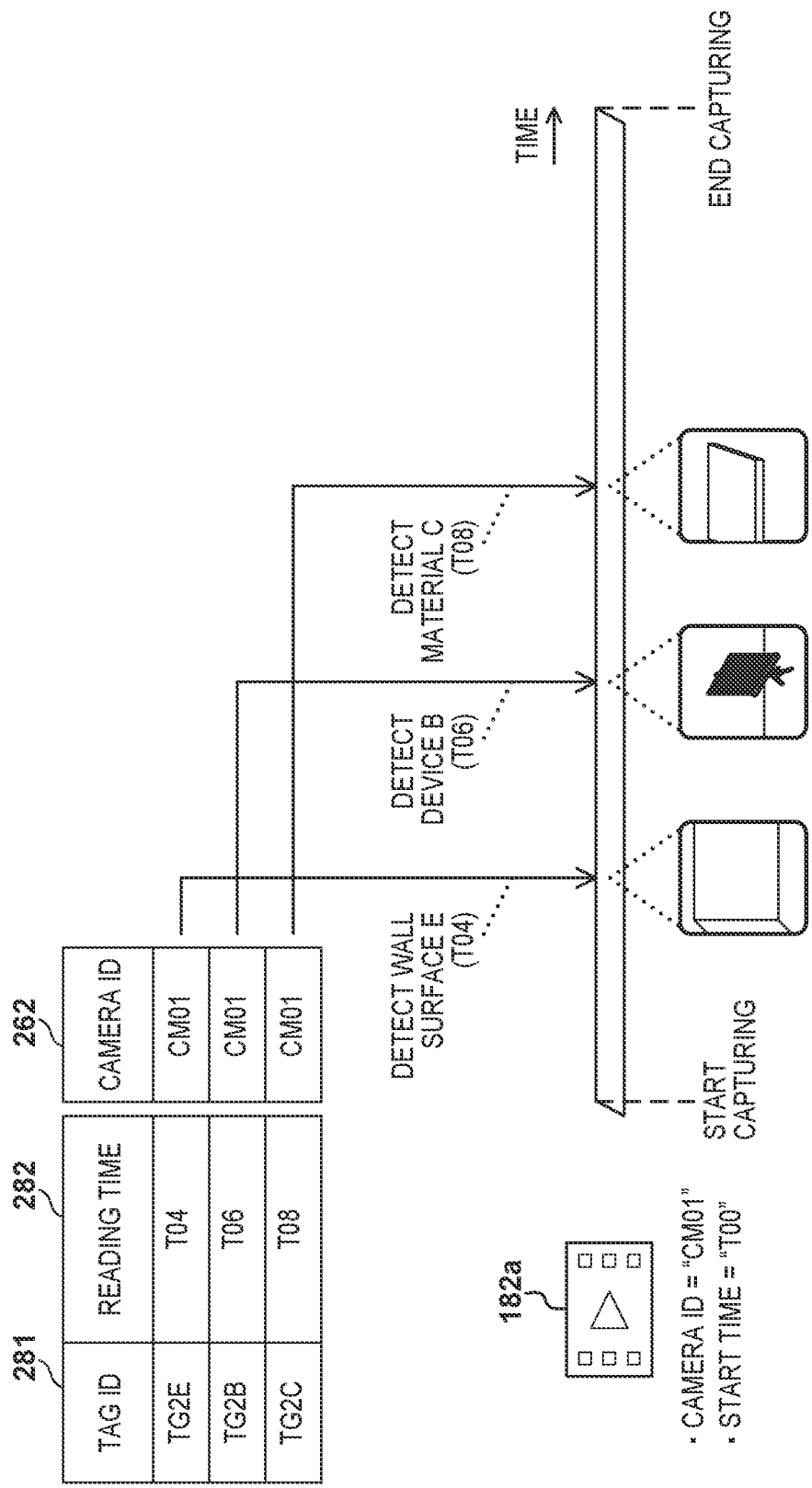
FIG. 8 is an explanatory diagram for explaining association of tag reading results with a video in the first embodiment.

FIG. 8 is an explanatory diagram illustrating the above-described association of the tag reading result with the video. As an example, it is assumed here that the three reading result records in the tag detection table 280 indicate that tag IDs "TG2E", "TG2B", and "TG2C" were read at times "T04", "T06", and "T08", respectively. Additionally, the reader ID indicated by these reading result records is assumed to be associated with the camera ID "CM01" in the reader-camera table 260. The lower part of FIG. 8 conceptually illustrates the video 182a captured by the camera 50 identified by the camera ID "CM01" during a period that starts at time "T00" and includes times "T04", "T06", and "T08". The band extending to the right from the video 182a represents the progress of the video along the time axis.

Here, it is assumed that a user wishes to browse scenes in which the device 20b ("Device B"), which is one of the management targets, is present. The tag detection table 280 indicates that the target tag 21b attached to the device 20b (identified by tag ID "TG2B") has been detected at time T06. Accordingly, by displaying the scene corresponding to time T06 of the video 182a (e.g., the scene that begins a few seconds before time T06), the user can immediately browse the scene in which the device 20b is present without having to exhaustively examine the entirety of the video 182a. The same applies to cases where the user intends to browse scenes in which another management target is present.

In the present embodiment, the camera 50 may be a 360-degree camera. A 360-degree camera synchronizes a plurality of image sensors having angles of view facing different directions (e.g., two angles of view to the front and the rear, or four different angles of view covering 90 degrees each), in order to capture images thereof in parallel. A plurality of images captured at the same timing may be composited into a single frame (e.g., having a 360-degree angle of view in the horizontal direction) using publicly-known stitching techniques, or may be recorded separately as-is. In the latter case, when displaying the video, the plurality of images may be composited and displayed in a single frame, or may be displayed in parallel in individual windows. Using a 360-degree camera as the camera 50 makes it possible to significantly increase the likelihood that the management target will be present in the video at the point in time when the target tag 21 for each management target is detected, even if the user patrolling within the real space does not intentionally point the angle of view of the camera 50 in a specific direction. The tag reader 100 may also be a reading apparatus capable of reading over 360 degrees. Configuring the tag reader 100 as a reading apparatus capable of reading in all directions (or a reading apparatus having low directionality) makes it possible to increase the likelihood that each RFID tag will be detected without forcing the user to focus on the orientation of the tag reader 100.

Although FIG. 7B illustrates an example in which the tag detection table 280 includes Reader ID 283 as a data element, the tag detection table 280 may include a data element indicating the corresponding camera ID instead of (or in addition to) Reader ID 283. In this case, when adding the reading result record to the tag detection table 280, the data management unit 292 obtains the value of the corresponding camera ID from the reader-camera table 260 and includes that value in the record.

<1-5-5. Control of Display (Reproduction)>

The UI control unit 293 accepts, on the screen of the display device of the user terminal 70, for example, a selection of a management target which the user 30 wishes to browse from among the one or more management targets being managed by the system. The tag ID stored in the target tag 21 attached to the management target selected here will be referred to as a first tag ID for explanatory purposes. The UI control unit 293 controls the user terminal 70 to display the scene corresponding to the reading time of the first tag ID in the video associated with the reading result that includes the first tag ID. Two practical examples of UIs for selecting the scene to be displayed will be described below with reference to FIGS. 9A to 10B.

(1) First Practical Example

Figure 9A:
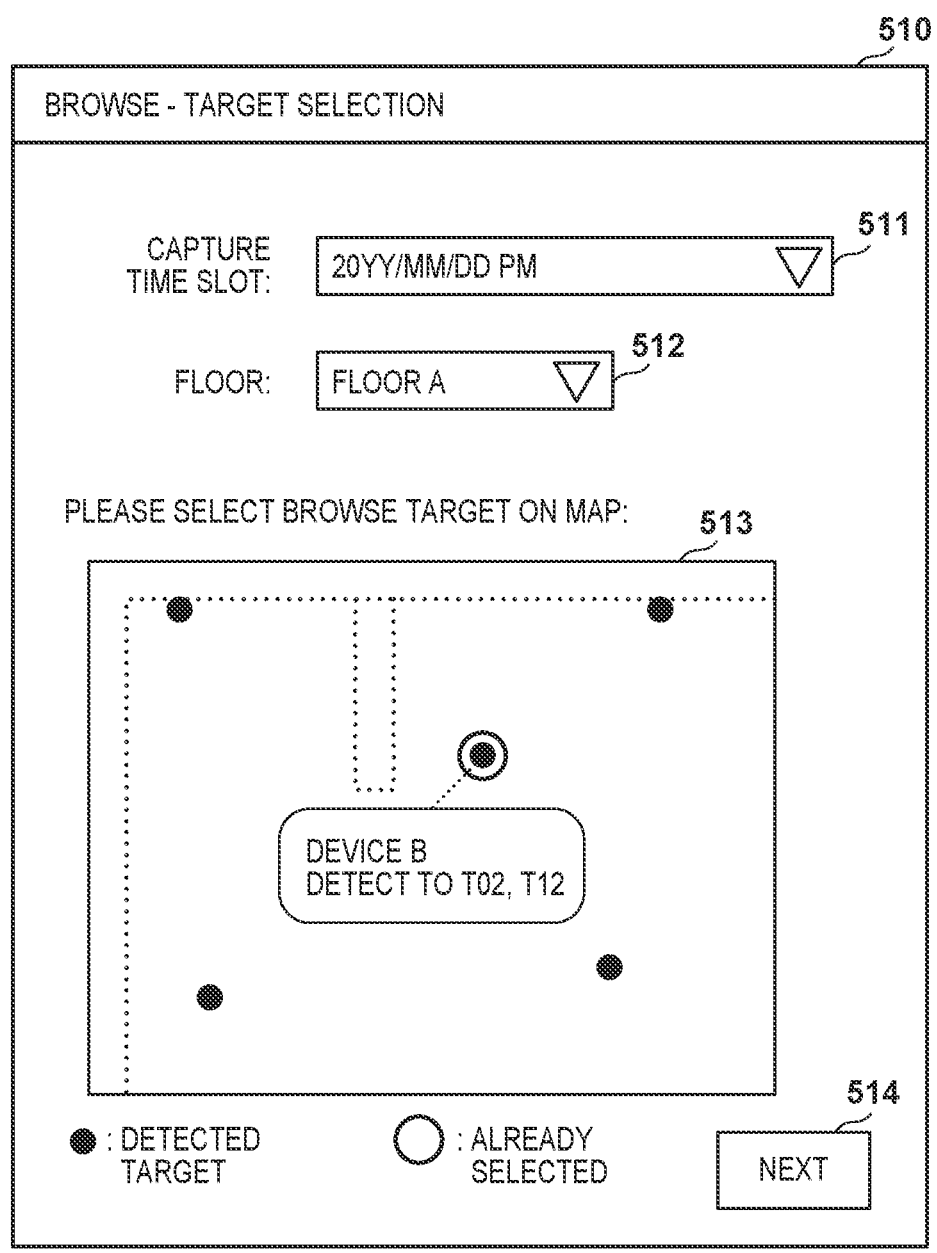
FIG. 9A is a first explanatory diagram for explaining a first practical example of a UI for scene selection.
Figure 9B:
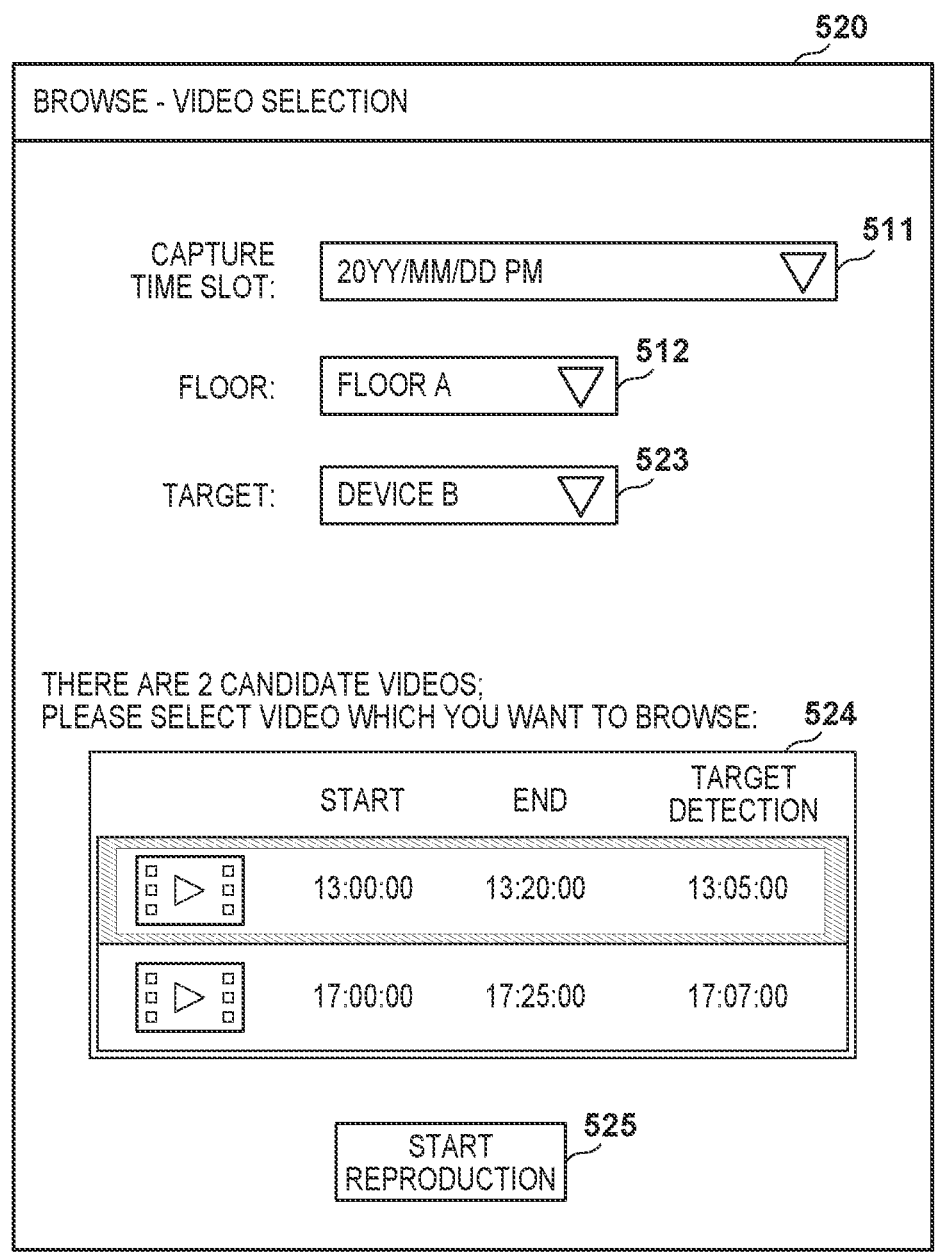
FIG. 9B is a second explanatory diagram for explaining the first practical example of a UI for scene selection.

FIGS. 9A and 9B are explanatory diagrams illustrating a first practical example of a scene selection UI. FIG. 9A illustrates an example of a target selection screen 510. The target selection screen 510 includes a time slot selection field 511, a floor selection field 512, a map display area 513, and a button 514. The time slot selection field 511 is an object for allowing the user to select a time slot in which a video of a management target which the user wishes to browse was captured. The floor selection field 512 is an object for allowing the user to select a floor 10 where the management target which the user wishes to browse was located. The map display area 513 is a region for presenting a map of the floor 10 selected in the floor selection field 512 to the user. The UI control unit 293 displays a map of the selected floor 10A in the map display area 513 based on Map Image 237 in the floor table 230. Furthermore, the UI control unit 293 causes icons (solid black circles, in the figure), which represent detection positions of target tags 21 detected on the same floor 10 during the selected time slot, to be displayed superimposed on the map image in the map display area 513. By operating (e.g., touching or clicking) one of the icons displayed in the map display area 513, the user can select the management target corresponding to that icon as the management target that he or she wish to browse. In the example in FIG. 9A, the device 20b named "Device B" is selected. When the user operates the button 514 in this state, the screen transitions to a video selection screen 520, illustrated in FIG. 9B.

FIG. 9B illustrates an example of the video selection screen 520. The video selection screen 520 includes the time slot selection field 511, the floor selection field 512, a target selection field 523, a list presentation area 524, and a button 525. The target selection field 523 is an object for allowing the user to select a management target that the user wishes to browse. Although the device 20b has already been selected as the desired management target in the example in FIG. 9B, the user may reselect the management target by operating the time slot selection field 511, the floor selection field 512, or the target selection field 523. The list presentation area 524 is a region for presenting, to the user, a list of one or more candidate videos in which the management target selected by the user may be present. The UI control unit 293 specifies, in the tag detection table 280, reading result records that have a reading time belonging to the selected time slot and indicate the tag ID of the target tag 21 of the selected management target. Additionally, the UI control unit 293 obtains video information (e.g., capture times of videos) pertaining to videos associated with the specified reading result records from the video server 150 (i.e., candidate videos). The UI control unit 293 then causes the obtained video information to be displayed in the list presentation area 524 in list format. In the example in FIG. 9B, a start time, an end time, and a target detection time (a reading time for the tag ID of the selected management target) for each candidate video are displayed in the list presentation area 524. By selecting one of the candidate videos presented in the list presentation area 524 and pressing the button 525, the user can request the video server 150 to reproduce the scene corresponding to the detection time of the selected management target.

The UI described with reference to FIGS. 9A and 9B can typically be realized by the UI control unit 293 working in conjunction with the user terminal 70. For example, the target selection screen 510 and the video selection screen 520 may be webpages displayed by a web browser running on the user terminal 70. Alternatively, the target selection screen 510 and the video selection screen 520 may be application screens of an application downloaded to and executed in the user terminal 70. The processor of the user terminal 70 executing a computer program for such a web browser or application may also be considered to be control means for controlling the UI. Note that in the following descriptions, the target selection screen 510 and the video selection screen 520 (as well as a video selection screen 530 and a point designation screen 540, which will be described below) may be collectively referred to as "browsing screens".

Regardless of how the browsing screens are implemented, when the user selects a single candidate video and presses the button 525 in the video selection screen 520, the user terminal 70 transmits a reproduction request including scene designation information along with the identification information of the selected video to the video server 150. As described above, the identification information of the video may be a combination of a camera ID and a capture start time (or a capture end time), for example. However, the configuration is not limited to this example, and any identifier, filename, or URL that may be given to each candidate video by the video server 150 and provided as video information may be used as the identification information of the video. The scene designation information may be a length of time that elapses from the capture start time, for example. The UI control unit 293 can calculate the elapsing time as the scene designation information by subtracting the capture start time from the target detection time, for example.

(2) Second Practical Example

Figure 10B:
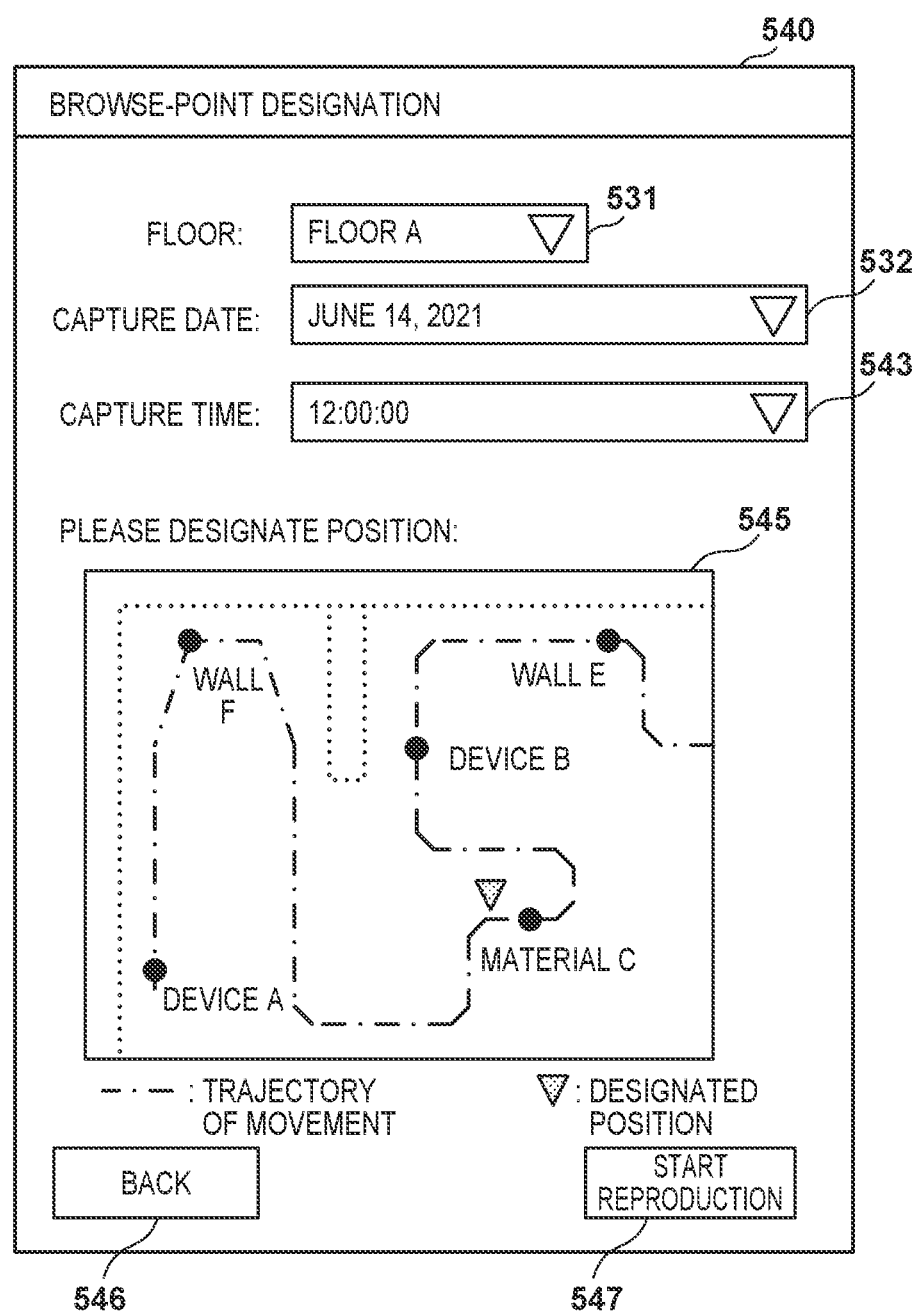
FIG. 10B is a second explanatory diagram for explaining the second practical example of a UI for scene selection.

FIGS. 10A and 10B are explanatory diagrams illustrating a second practical example of a scene selection UI. FIG. 10A illustrates an example of the video selection screen 530. The video selection screen 530 includes a floor selection field 531, a capture date selection field 532, a list presentation area 533, and a button 534. The floor selection field 531 is an object for allowing the user to select a floor 10 where a management target which the user wishes to browse was located. The capture date selection field 532 is an object for allowing the user to select a date on which videos of the management target which the user wishes to browse were captured. In the example in FIG. 10A, the capture date selection field 532 is an object in calendar format, and the dates on which candidate videos are present are enclosed in circular marks. The list presentation area 533 is a region for presenting, to the user, a list of videos captured on the capture date selected by the user. In the example in the lower part of FIG. 10A, "Jun. 14, 2021" is selected as the capture date, and icons representing four videos captured at different times on the capture date are displayed in the list presentation area 533. By pressing one of the icons displayed in the list presentation area 533, the user can select the video corresponding to that icon as a candidate video. When the user then presses the button 534, the screen transitions to the point designation screen 540, illustrated in FIG. 10B.

FIG. 10B illustrates an example of the point designation screen 540. The point designation screen 540 includes the floor selection field 531, the capture date selection field 532, a capture time selection field 543, a point designation area 545, a first button 546, and a second button 547. Although a video captured on the specific floor 10, at a specific date and time, has already been selected as the candidate video in the example in FIG. 10B, the user may reselect a candidate video by operating the floor selection field 531, the capture date selection field 532, or the capture time selection field 543. The point designation area 545 is a region for presenting a map of the floor 10 selected in the floor selection field 531 to the user. The UI control unit 293 displays a map of the selected floor 10A in the point designation area 545 based on Map Image 237 in the floor table 230. The UI control unit 293 also causes the trajectory of movement of the tag reader 100 (the dot-dash line, in the figure) during the capture period of the selected candidate video to be displayed superimposed on the map image in the point designation area 545 based on a sequence of position coordinates in Measurement Position 274 in the movement amount table 270. The UI control unit 293 further causes icons (solid black circles, in the figure), which represent detection positions of target tags 21 detected during the capture period of the selected candidate video, to be displayed superimposed on the map image. The user can designate any point in the point designation area 545 (e.g., a point in the vicinity of the management target that the user wishes to browse) by touching or clicking that point, for example. When a user presses the second button 547 in a state where a point has been designated, a reproduction request is transmitted from the user terminal 70 to the video server 150. Here, the time corresponding to the point on the trajectory of the movement of the tag reader 100 having the smallest distance from the designated point is taken as the designated time. The UI control unit 293 can calculate the time that has elapsed from the start of the video for the scene to be reproduced by subtracting the capture start time of the selected candidate video from the designated time, for example. The reproduction request transmitted in response to the second button 547 being pressed may include the identification information of the selected candidate video and the scene designation information indicating this elapsed time. When the user presses the first button 546, the screen may transition to the video selection screen 530, illustrated in FIG. 10A.

(2) Other Practical Examples

Although two practical examples of UIs for selecting the scene to be displayed have been described in detail in this section, other practical examples are also conceivable. As an example, the UI control unit 293 may allow the user to select a camera ID and capture date, present the user with a list of candidate videos identified by the selected camera ID and capture date, and then allow the user to select one of the candidate videos in the list. As another example, in a scene reproduction screen displayed by the display device of the user terminal 70, a UI object for causing the scene to jump to the tag detection time (the reading time of the tag ID) immediately before or immediately after may be provided after the reproduction is started.

<1-4. Flow of Processing>

Figure 11:
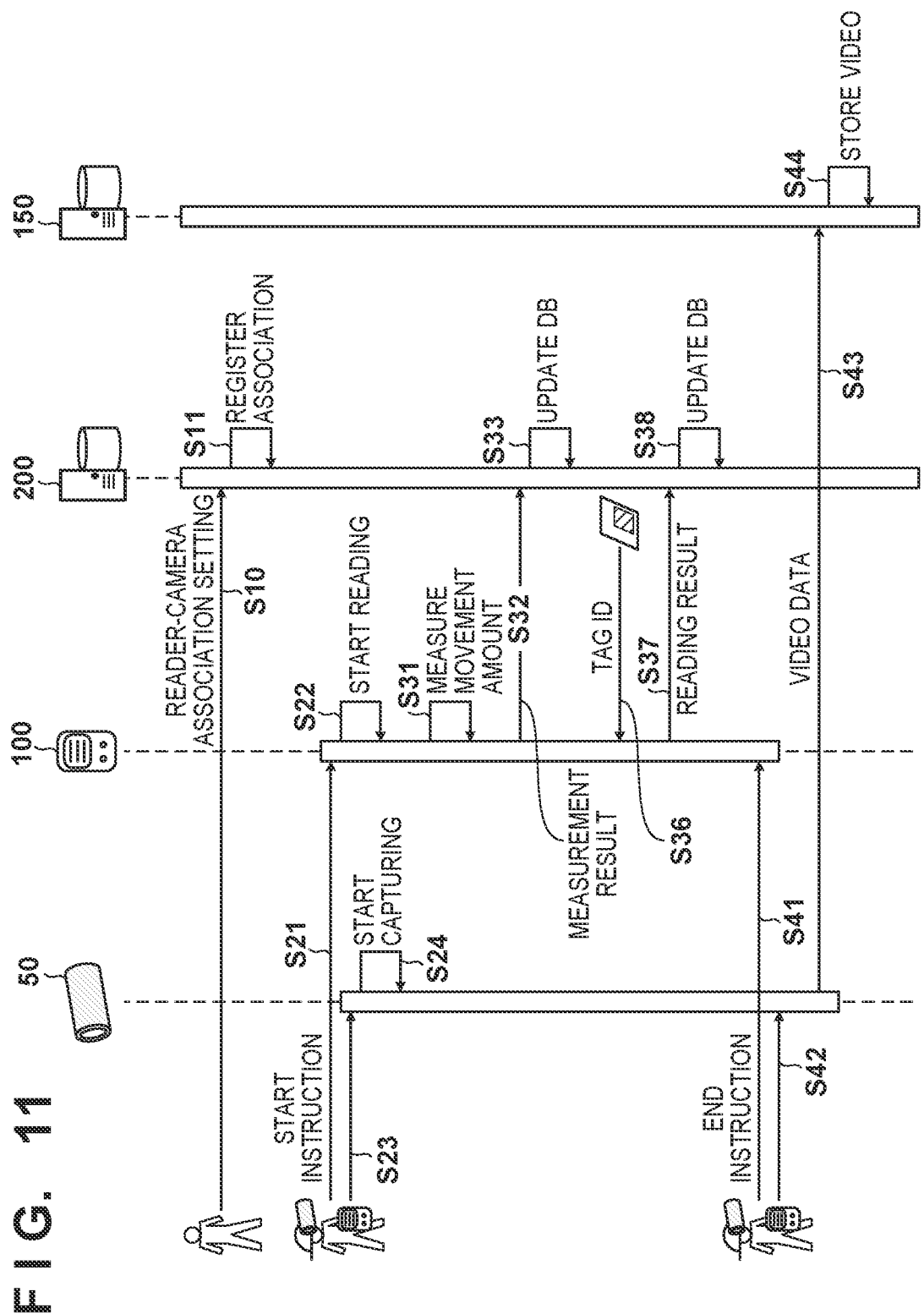
FIG. 11 is a sequence diagram illustrating an example of an overall flow of processing at the time of capturing.
Figure 12:
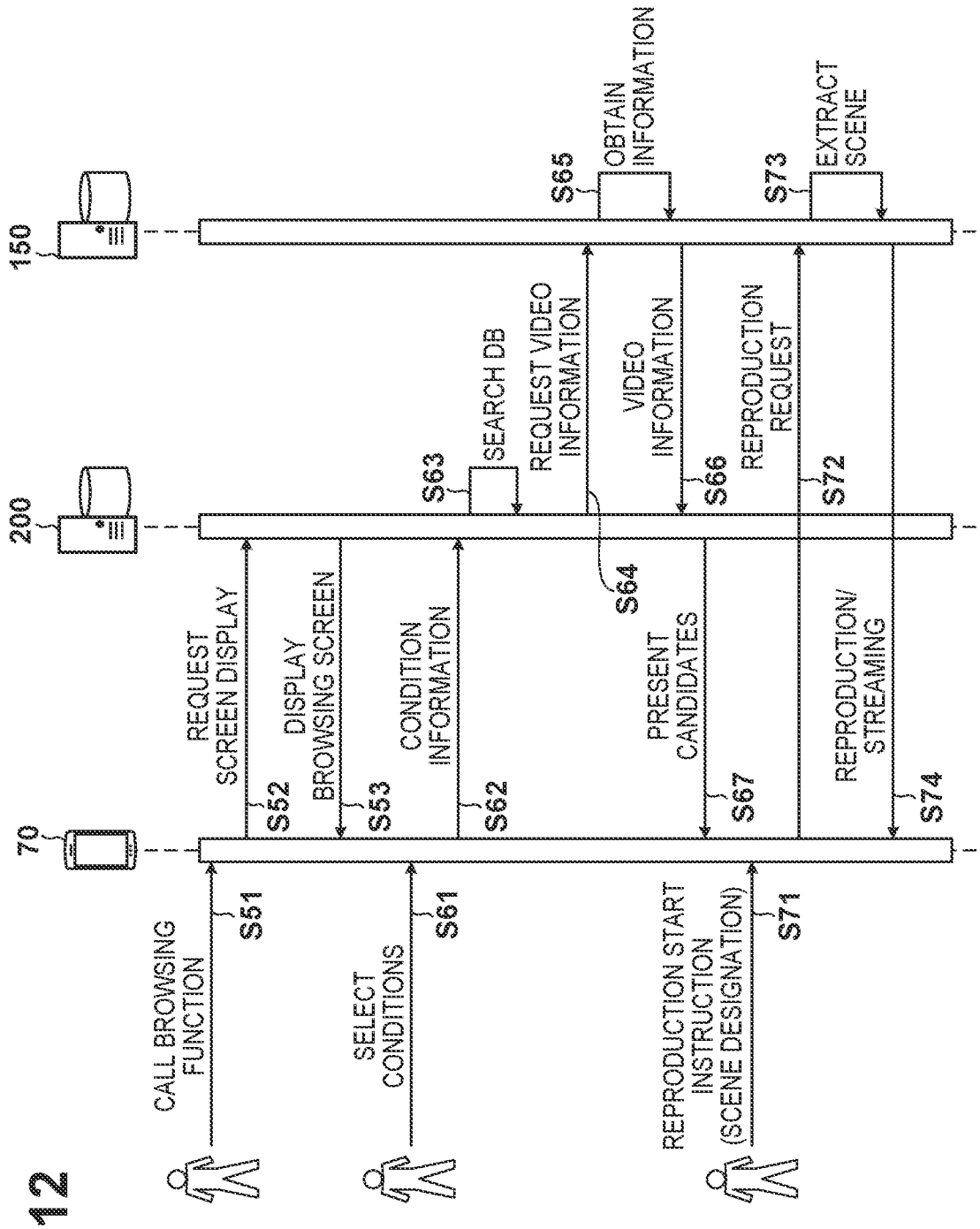
FIG. 12 is a sequence diagram illustrating an example of an overall flow of processing at the time of browsing.

This section will describe several examples of flows of processing that can be executed in the video management system 1 according to the present embodiment, with reference to the sequence diagrams in FIGS. 11 and 12 and the flowcharts in FIGS. 13 to 16. Note that in the following descriptions, processing steps are indicated by an S, indicating "step".

<1-6-1. Overall Flow of Processing During Capture>

FIG. 11 is a sequence diagram illustrating an example of the overall flow of processing at the time of capturing according to the present embodiment. The sequence illustrated in FIG. 11 mainly involves the camera 50, the tag reader 100, the video server 150, and the management server 200.

Prior to the start of capture and tag reading, in S10, the user sets the association between the camera 50 and the tag reader 100 through the UI provided by the management server 200, for example. In S11, the registration unit 291 of the management server 200 registers the association input by the user in the reader-camera table 260. Here, it should be noted that the setting and registration of the association only need to be performed once as long as the combination of the camera 50 and the tag reader 100 is not changed.

When the time to record a video arrives, the user starts patrolling the floor 10 while wearing or carrying the camera 50 and the tag reader 100. At the start of the patrol, in S21, the user instructs the tag reader 100 to start reading tags. In S22, the control unit 101 of the tag reader 100 activates the reading unit 106 to start attempting to read tags. In S23, the user instructs the camera 50 to start capturing. In S24, the camera 50 starts capturing video on the floor 10.

While the user continues patrolling the floor 10, in S31, the measuring unit 104 of the tag reader 100 iteratively measures the relative amount of movement of the tag reader 100 (only steps related to a single instance of measurement are illustrated in FIG. 11). In S32, the control unit 101 of the tag reader 100 transmits measurement result data to the management server 200. In S33, the data management unit 292 of the management server 200 adds a measurement result record to the movement amount table 270 of the reading result DB 220 based on the measurement result data received from the tag reader 100.

In addition, when the user approaches a position tag 11 or a target tag 21, in S36, the reading unit 106 of the tag reader 100 reads the tag ID from that tag. In response to the tag ID being read, in S37, the control unit 101 of the tag reader 100 transmits reading result data to the management server 200. In S38, the data management unit 292 of the management server 200 adds a reading result record to the tag detection table 280 of the reading result DB 220 based on the reading result data received from the tag reader 100. S36 to S38 may be repeated the same number of times as there are RFID tags detected on the floor 10.

Once the user finishes patrolling the floor 10, in S41, the user instructs the tag reader 100 to end the reading of tags. In S42, the user instructs the camera 50 to end capturing. In S43, the camera 50 transmits video data of the captured video (encoded and formatted into a predetermined file format as necessary) to the video server 150. In S44, the video management unit 170 of the video server 150 stores the video data received from the camera 50 in the video DB 180 (along with the camera ID and the capture time).

<1-6-2. Overall Flow of Processing During Browsing>

FIG. 12 is a sequence diagram illustrating an example of the overall flow of processing at the time of browsing according to the present embodiment. The sequence illustrated in FIG. 12 mainly involves the user terminal 70, the video server 150, and the management server 200.

First, in S51, the user operates the user terminal 70 to call a browsing function in order to browse scenes of a desired video. In response to this call, in S52, the user terminal 70 requests the management server 200 to display a browsing screen. In response to the request received from the user terminal 70, in S53, the UI control unit 293 of the management server 200 causes the display device of the user terminal 70 to display one of the browsing screens described above as examples.

Next, in S61, the user selects conditions related to a scene that the user wishes to browse in the displayed browsing screen. The conditions to be selected here can include, for example, at least one of a floor, a capture time slot, a capture date, a management target, and a position on a map. In S62, the user terminal 70 transmits information indicating the conditions selected by the user to the management server 200. In S63, the UI control unit 293 of the management server 200 searches the tag detection table 280 for a tag reading result that satisfies the selected conditions. It is assumed here that the at least one tag reading result is specified as a result of the search. Next, in S64, the UI control unit 293 makes a request to the video server 150 for video information of a video associated with the tag reading result specified in S63. In S65, the video management unit 170 of the video server 150 obtains the requested video information from the video DB 180 in response to the video information request being received. Next, in S66, the video management unit 170 returns the video information obtained in S65 to the management server 200. In S67, the UI control unit 293 of the management server 200 presents information about at least one candidate video that satisfies the conditions selected by the user, to the user on the browsing screen displayed in the user terminal 70.

Next, in S71, the user selects one of the candidate videos presented, and gives an instruction to start reproducing a scene. In response to the instruction from the user, in S72, the user terminal 70 transmits a reproduction request including scene designation information to the video server 150. In S73, in response to the reproduction request being received, the reproduction control unit 190 of the video server 150 extracts the scene to be reproduced from the video data 181 of the selected video, stored in the video DB 180. Then, in S74, the reproduction control unit 190 reproduces or streams the extracted scene by sequentially transmitting video packets to the user terminal 70.

<1-6-3. Tag Reading Processing (Tag Reader)>

Figure 13:
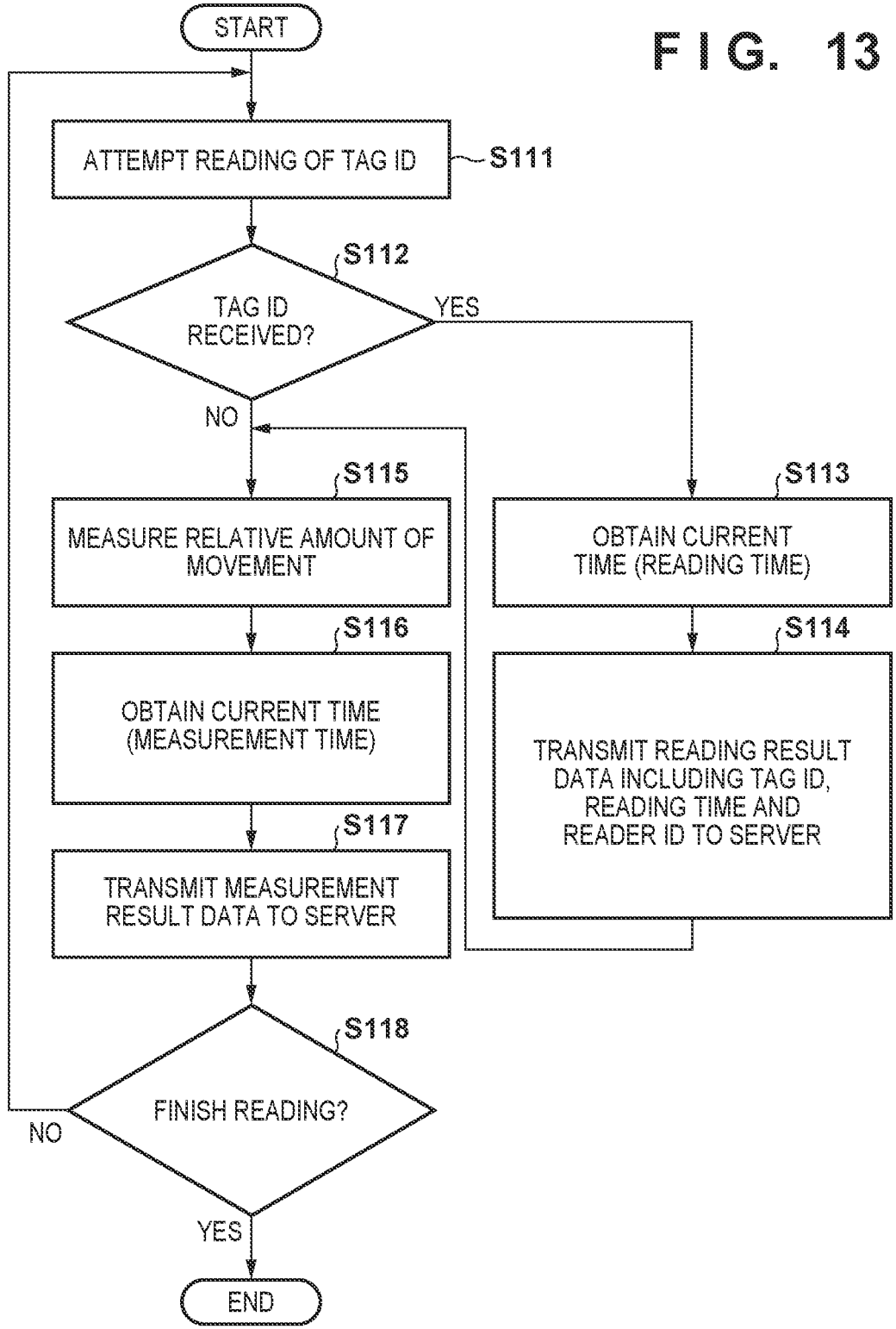
FIG. 13 is a flowchart illustrating an example of a flow of tag reading processing performed by a tag reader.

FIG. 13 is a flowchart illustrating an example of the flow of tag reading processing performed by the tag reader 100. The tag reading processing in FIG. 13 corresponds to the processing performed by the tag reader 100 in S22 to S37 in FIG. 11, and may be started in response to the tag reader 100 being activated or some kind of user operation being made in the tag reader 100.

First, in S111, the reading unit 106 attempts to read a tag ID from a nearby RFID tag by emitting electromagnetic waves within a tag reading range. If, as a result of the tag reading attempt, a tag ID is received from a nearby RFID tag using the electromagnetic wave energy (S112—Yes), the sequence moves to S113. On the other hand, if no tag ID is received (S112—No), the sequence moves to S115.

If a tag ID is received, in S113, the control unit 101 obtains the current time as the reading time of the tag ID by referring to an internal real-time clock, for example. Next, in S114, the control unit 101 transmits, to the management server 200, the reading result data, including the read tag ID, the reading time, and the reader ID of the tag reader 100, to the management server 200 via the communication unit 103. The sequence then moves to S115.

In S115, the measuring unit 104 measures the relative amount of movement of the tag reader 100 based on sensor data output from, for example, a three-axis acceleration sensor, a gyro sensor, and a geomagnetic sensor. Next, in S116, the control unit 101 obtains the current time as the measurement time. Then, in S117, the control unit 101 transmits, to the management server 200, the measurement result data, including the relative amount of movement measured by the measuring unit 104, the measurement time, and the reader ID of the tag reader 100, to the management server 200 via the communication unit 103.

Next, in S118, the control unit 101 determines whether the tag reading processing should be ended. For example, if a user operation indicating that the reading is to be ended is detected, the tag reading processing is ended. Otherwise, the above-described S111 to S117 may be repeated again.

<1-6-4. Data Reception Processing (Management Server)>

Figure 14:
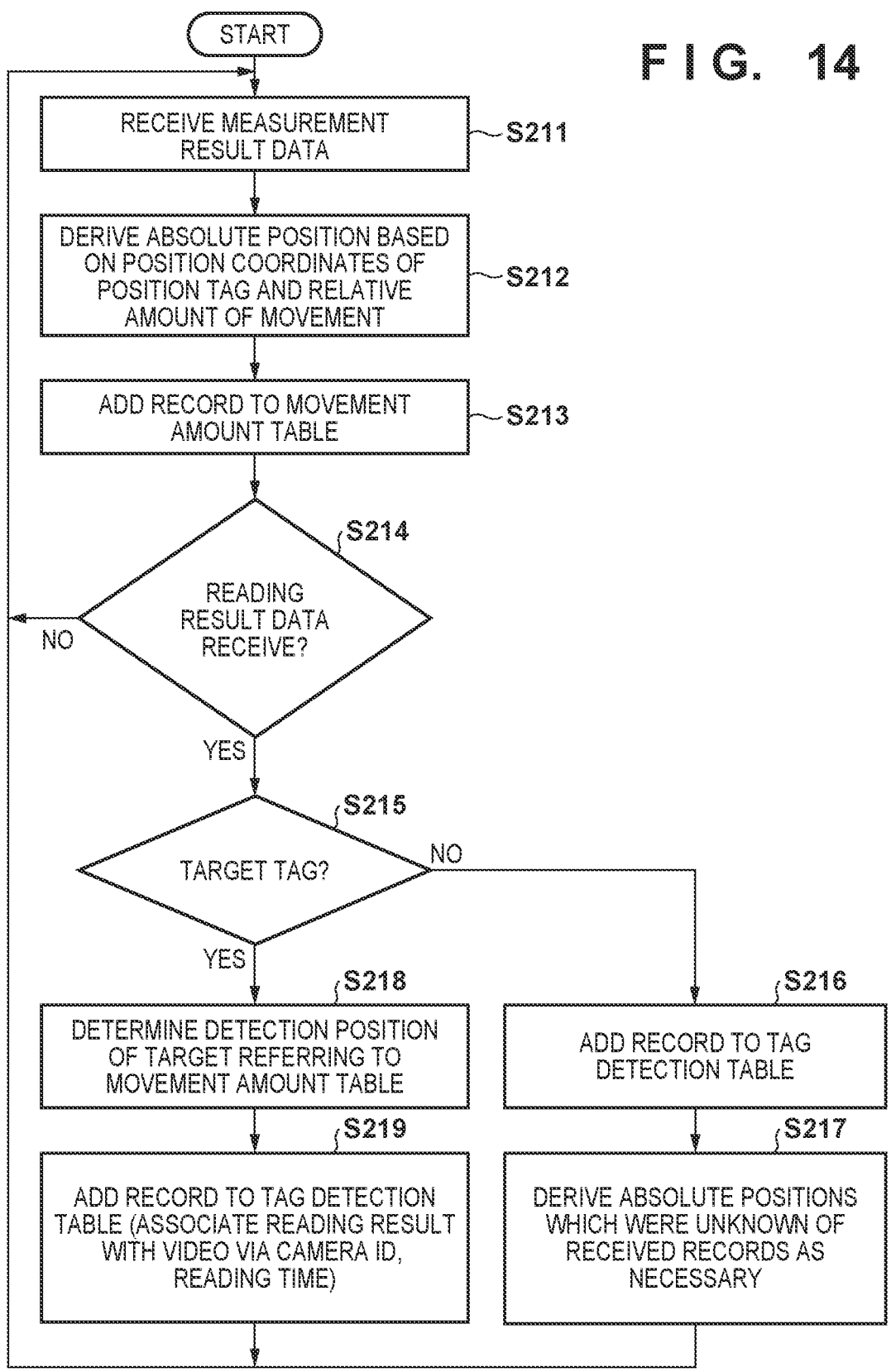
FIG. 14 is a flowchart illustrating an example of a flow of data reception processing performed by a management server.

FIG. 14 is a flowchart illustrating an example of the flow of data reception processing executed by the management server 200. The data reception processing in FIG. 14 corresponds to the processing performed by the management server 200 in S32 to S38 in FIG. 11, and can be performed iteratively by the management server 200.

First, in S211, the data management unit 292 of the management server 200 receives the measurement result data periodically transmitted from the tag reader 100. Next, in S212, the data management unit 292 derives the latest absolute position of the tag reader 100 based on the known position coordinates of a detected position tag 11 and the relative amount of movement indicated by the received measurement result data. Note that S212 may be skipped until the first time a position tag 11 is detected after the tag reader 100 is activated. Next, in S213, the data management unit 292 adds a measurement result record, including the measurement time, the reader ID, and the amount of movement indicated by the received measurement result data, as well as the position information indicating the absolute position derived in S212, to the movement amount table 270.

While executing S211 to S213 repeatedly, in S214, the data management unit 292 waits for receiving reading result data from the tag reader 100. Once reading result data is received from the tag reader 100, the sequence moves to S215. In S215, the sequence branches depending on for which type of RFID tag the reading result data has been received. If reading result data for a position tag 11 has been received, the sequence moves to S216. On the other hand, if reading result data for a target tag 21 has been received, the sequence moves to S218.

In S216, the data management unit 292 adds a reading result record, including the tag ID, the reading time, and the reader ID indicated by the reading result data received for the position tag 11, to the tag detection table 280. Next, in S217, the data management unit 292 derives absolute positions for measurement result records and reading result records for which absolute positions were unknown due to being received before detection of any position tag 11, and updates the values of the position information (Measurement Position 274 or Detection Position 284). The sequence then returns to S211.

In S218, the data management unit 292 specifies a measurement result record having the closest measurement time to the reading time of the received reading result data in the movement amount table 270, and determines the detection position of the target tag 21 by referring to the value of Measurement Position 274 in the specified record. Next, in S219, the data management unit 292 adds a reading result record, including the tag ID, the reading time, and the reader ID indicated by the reading result data received for the target tag 21, as well as the detection position, to the tag detection table 280. Here, as described with respect to S11 in FIG. 11, the association between the camera 50 and the tag reader 100 is registered in the reader-camera table 260 prior to the data reception processing in FIG. 14. In addition, a video captured by the camera 50 can be identified by the camera ID of the camera 50 and a capture time. Accordingly, including the reading time and the reader ID in the reading result record in S219 corresponds to associating the reading result from the tag reader 100 with the video through the camera ID and the reading time. The sequence then returns to S211.

Here, an example has been described in which the measurement result data is transmitted and received each time an amount of movement is measured, and the reading result data is transmitted and received each time a tag is read, between the tag reader 100 and the management server 200. However, it is also possible to transmit and receive the data all at once after the capturing has ended. For example, it is advantageous to first accumulate the data in the tag reader 100 in situations where video is captured in a location where signals from base stations are weak, such as within buildings or underground. In this case, the tag reader 100 may transmit the accumulated data to the management server 200 at a later time (when communication is once again possible).

<1-6-5. Display Control Processing (Management Server/User Terminal)>

(1) First Practical Example

Figure 15:
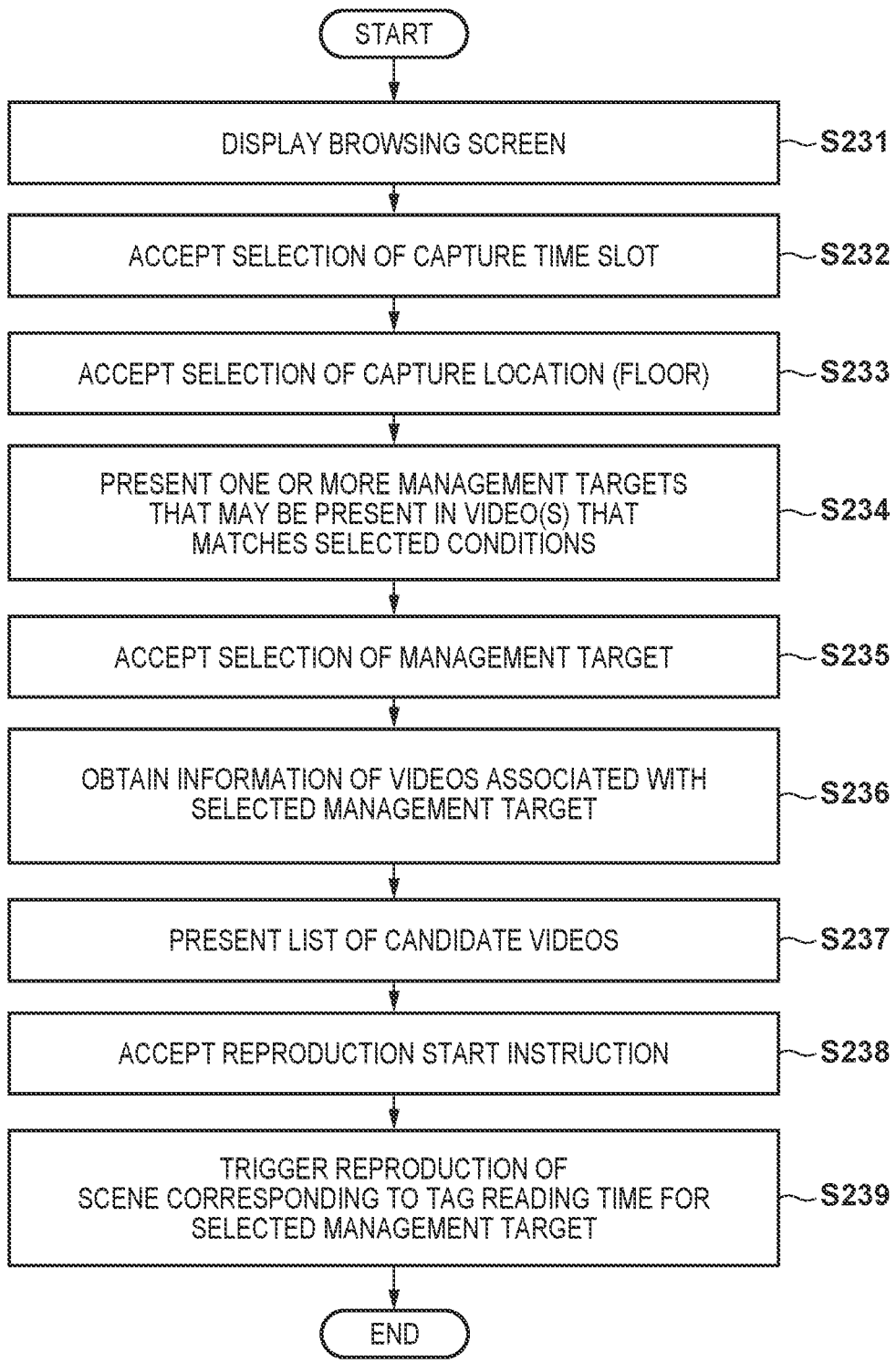
FIG. 15 is a flowchart illustrating an example of a flow of display control processing according to a first practical example.

FIG. 15 is a flowchart illustrating an example of the flow of display control processing according to the first practical example described above, executed by the management server 200. The display control processing illustrated in FIG. 15 mainly corresponds to the processing performed by the management server 200 in the sequence illustrated in FIG. 12, however, some steps involve the user terminal 70.

First, in S231, the UI control unit 293 of the management server 200 causes the user terminal 70 to display the target selection screen 510, which is a type of browsing screen, described with reference to FIG. 9A. Next, in S232, the UI control unit 293 accepts, through the target selection screen 510, a selection of a capture time slot for a video that the user wishes to browse. Additionally, in S233, the UI control unit 293 accepts, through the target selection screen 510, a selection of a floor that was the capture location for a video that the user wishes to browse. Next, in S234, the UI control unit 293 specifies one or more management targets that may be present in a video that meets the selected conditions by searching the tag detection table 280, and presents the result thereof to the user in the target selection screen 510. For example, on the target selection screen 510, icons representing management targets may be superimposed on a map image of the selected floor, or a list of management targets may be displayed.

Next, in S235, the UI control unit 293 accepts, through the target selection screen 510, a selection of a management target that the user wishes to browse. Next, in S236, the UI control unit 293 obtains video information pertaining to videos associated with the selected management target (i.e., a candidate video) from the video server 150. Next, in S237, the UI control unit 293 causes the user terminal 70 to display the video selection screen 520 described with reference to FIG. 9B, and presents the user with a list of candidate videos along with the video information obtained from the video server 150. In S238, the user terminal 70 accepts, through the video selection screen 520, a reproduction start instruction, including a selection of a video to be reproduced, from the user. Then, in S239, the user terminal 70 triggers reproduction of the scene corresponding to the tag reading time for the management target selected in S235 by transmitting a reproduction request to the video server 150 in accordance with the reproduction start instruction received.

(2) Second Practical Example

Figure 16:
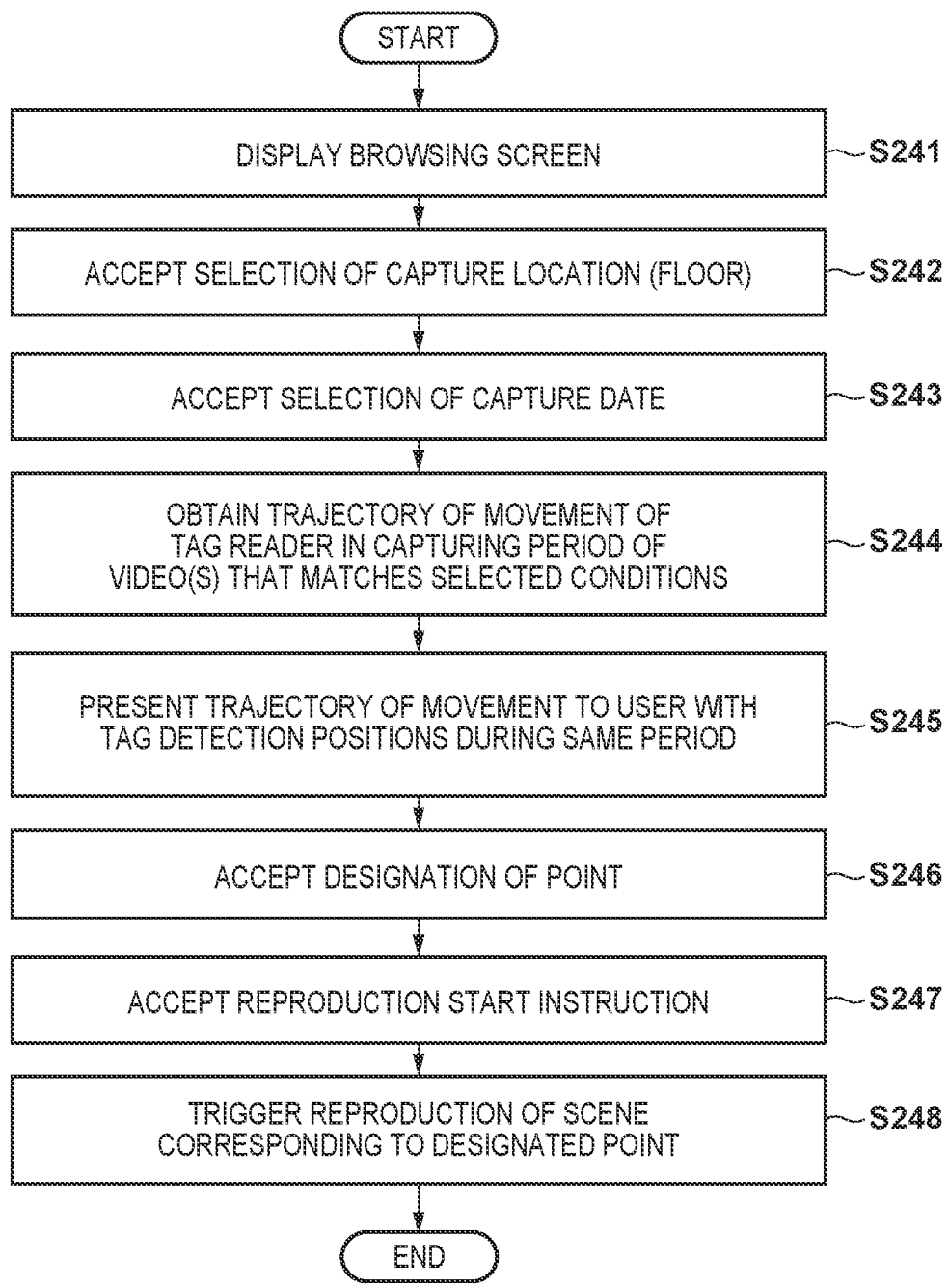
FIG. 16 is a flowchart illustrating an example of a flow of display control processing according to a second practical example.

FIG. 16 is a flowchart illustrating an example of the flow of display control processing according to the second practical example described above, executed by the management server 200. The display control processing illustrated in FIG. 16 mainly corresponds to the processing performed by the management server 200 in the sequence illustrated in FIG. 12, however, some steps involve the user terminal 70.

First, in S241, the UI control unit 293 of the management server 200 causes the user terminal 70 to display the video selection screen 530, which is a type of browsing screen, described with reference to FIG. 10A. Next, in S242, the UI control unit 293 accepts, through the video selection screen 530, a selection of a floor that was the capture location for a video that the user wishes to browse. Additionally, in S243, the UI control unit 293 accepts, through the video selection screen 530, a selection of a capture date for a video that the user wishes to browse. Next, in S244, the UI control unit 293 obtains, from the movement amount table 270, a trajectory of movement of the tag reader 100 during the period in which a video that meets the selected conditions was captured. At this time, the UI control unit 293 can determine the capture period of a video that meets the selected conditions by querying the video server 150 for the video information. Next, in S245, the UI control unit 293 causes the user terminal 70 to display the point designation screen 540 described with reference to FIG. 10B, and presents the trajectory of movement of the tag reader 100 to the user along with detection positions of target tags 21 detected during the same period.

Next, in S246, the user terminal 70 accepts a designation of a point that the user wishes to browse (within the selected floor) through the point designation screen 540. Next, in S247, the user terminal 70 accepts a reproduction start instruction from the user. Then, in S248, the user terminal 70 triggers the reproduction of a scene corresponding to the point designated in S246 by transmitting a reproduction request to the video server 150.

<1-7. Summary of First Embodiment>

According to the first embodiment described in this section, a tag ID is read by a tag reader from a target tag, which is a passive-type RFID tag attached to each of one or more management targets, while a video of a real space is being captured by a capturing apparatus. A reading result (which can include the tag ID and a reading time of the tag ID) by the tag reader is then stored in a database in association with the video captured by the capturing apparatus so that a portion of the video corresponding to the reading time of each tag ID is able to be extracted. Accordingly, if the user wishes to browse a scene in which a specific management target is present, the user can access the scene in which the management target is present (e.g., can reproduce a partial video or a still image) based on the reading time of the tag ID of the target tag attached to the management target. There is thus no need for the user to exhaustively examine the entire video. Additionally, as the system according to the present embodiment does not require image recognition to discern between management targets, it functions effectively even in situations where the appearance of a management target can change over time rather than being static.

Additionally, each video is stored together with information identifying the capturing apparatus (e.g., a camera ID) and a capturing time of the video, and the association of the reading result from the tag reader with the video can be achieved using the information identifying the capturing apparatus. Accordingly, to associate the reading result with the video, it is sufficient for the capturing apparatus to store information that identifies the capturing apparatus itself in advance and add that information to the video data of each video. It is sufficient for the server or database that stores the video to store the video data of each video along with the information identifying the capturing apparatus and the capturing time. According to this configuration, the above-described video management system can be constructed at a low cost by utilizing a capturing device, storage, or content server that is already available on the market.

Additionally, in the above-described embodiment, when a first management target is selected by the user, a portion, in a video associated with a first tag ID of a first RFID tag attached to the first management target, corresponding to the reading time of the first tag ID, may be reproduced on a screen of a user terminal. Accordingly, simply selecting the desired management target through the UI enables the user to immediately browse the scene in which the management target may be present. According to the first practical example, a list of one or more candidate videos that are associated with corresponding ones of one or more reading results for the first tag ID can be presented to the user, and a corresponding scene in a video selected from the presented list can be reproduced. In this case, for example, the user can focus on one of management targets which can be an item or a specific section to sequentially browse scenes in which the management target has been captured at different points in time, and efficiently check how an appearance of that management target has changed over time. According to the second practical example, the position of the tag reader is measured during a capture period, and a trajectory of movement of the tag reader and a reading position at which the tag ID has been read from each RFID tag are displayed on the screen of the user terminal. The scene corresponding to a point designated by the user on the screen in the captured video can then be reproduced. In this case, the user can easily select and browse the scene in which the desired position has been captured while checking, on the screen, the positional relationship of management targets present at the site, for example. If the position of the tag reader is measured using a self-localization method that does not rely on signals from the exterior, such as a GPS satellite or a base station, the above-described system can also be applied to the management of construction performed inside a building or underground, for example.

2. Second Embodiment

The foregoing first embodiment described an example in which a moving entity, such as the user 30, carries or wears a capturing apparatus and a reading apparatus (or a single apparatus that integrates the two), and patrols a real space. In a second embodiment, described in this section, the reading apparatus is assumed to be carried by, worn by, or mounted on a moving entity, while the capturing apparatus is present in a real space separately from the reading apparatus. An RFID tag is attached to the capturing apparatus as a target tag, and the reading apparatus attempts to read the tag ID while the capturing apparatus is capturing a video.

<2-1. System Overview>

Figure 17:
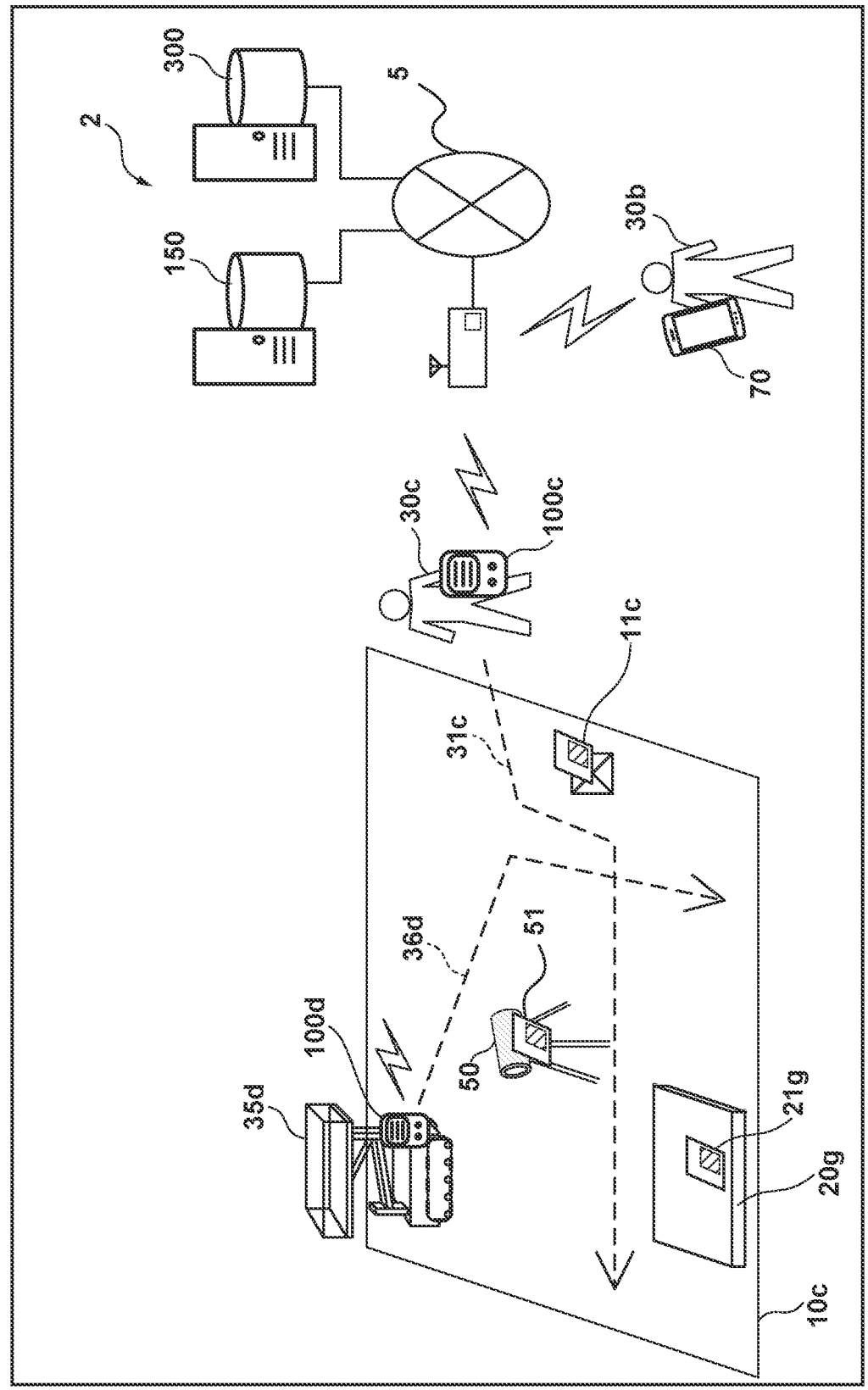
FIG. 17 is a schematic view illustrating an example of a configuration of a video management system according to a second embodiment.

FIG. 17 is a schematic diagram illustrating an example of a configuration of a video management system 2 according to the second embodiment. Like the video management system 1, the video management system 2 is a system that manages videos of a real space captured by cameras using a database and allows the videos to be browsed by users.

FIG. 17 illustrates a floor 10c, which can be a construction site, as an example of the real space. An item 20g is placed on the floor 10c, and a target tag 21g is attached to the item 20g. A position tag 11c is installed on the floor 10c. Additionally, in the present embodiment, a camera 50 is installed on the floor 10c, and a camera tag 51 is attached to the camera 50. The videos captured by the camera 50 are transmitted to the video server 150 and stored in a database.

A user 30c is a worker involved in the construction on the floor 10c, and is a moving entity. The user 30c carries a tag reader 100c and patrols the floor 10c periodically (e.g., along the broken line arrow 31c in the figure). FIG. 17 also illustrates a vehicle 35d, which is a different moving entity. The vehicle 35d is equipped with a tag reader 100d, and the vehicle 35d moves on the floor 10c (for example, along the broken line arrow 36d in the figure).

While the user 30c is patrolling the floor 10c, and while the vehicle 35d is moving on the floor 10c, the camera 50 captures videos, and the tag readers 100c and 100d attempt to read information from RFID tags. Then, the results of reading of information from the camera tag 51 by the tag readers 100c and 100d are stored in a database in association with the video captured by the camera 50, which makes it possible to extract a scene corresponding to the reading time of the camera tag 51 from that video.

<2-2. Overall System Configuration>

The video management system 2 includes the camera 50, the user terminal 70, the tag reader 100, the video server 150, and a management server 300. The user terminal 70, the tag reader 100, the video server 150, and the management server 300 are connected to each other via the network 5. The camera 50 is a capturing apparatus that captures videos to record them. The camera tag 51 attached to the camera 50 is assumed to be a passive tag, like the position tags 11 and the target tags 21. The user terminal 70 is a terminal apparatus that is utilized by the user 30 of the video management system 2. The tag reader 100 is a reading apparatus that reads information from the RFID tags. The video server 150 is an information processing apparatus that has a database in which videos captured by the camera 50 are stored and accumulated. Examples of the configurations of these apparatuses have already been described in the previous section, and will therefore not be described again here.

The management server 300 is an information processing apparatus that has a database which stores the results of tag reading by the tag readers 100 (e.g., the tag readers 100c and 100d). The management server 300 may be implemented as an application server, a database server, or a cloud server, for example, by using a high-end general-purpose computer. Similar to the management server 200 according to the first embodiment, the management functions of the management server 300 may be provided by a single apparatus, or by physically-separate multiple apparatuses which operate in conjunction with each other. The video server 150 and the management server 300 may be realized as an integrated single server apparatus.

<2-3. Configuration Example of Management Server>
<2-3-1. Basic Configuration>

Figure 18:
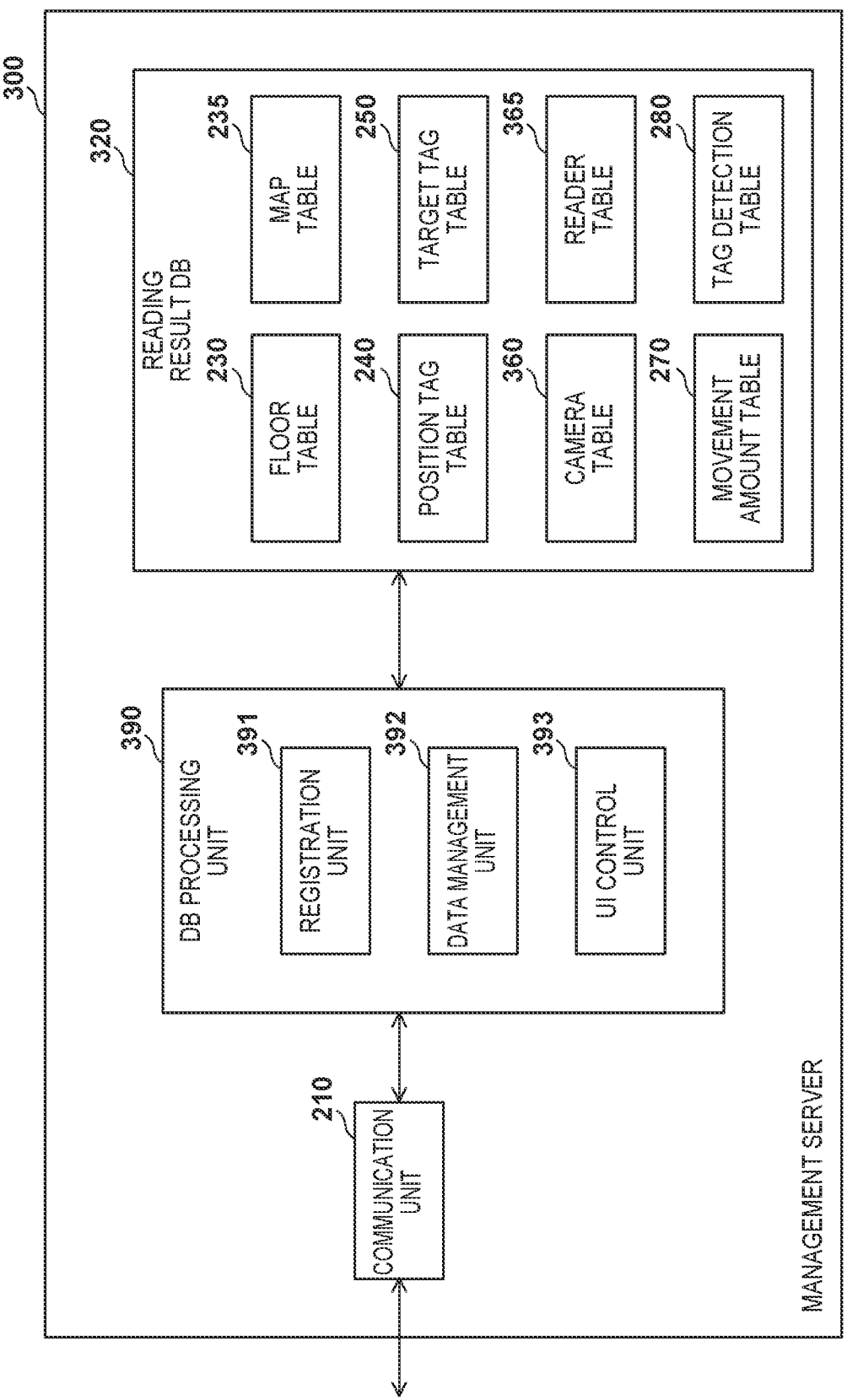
FIG. 18 is a block diagram illustrating an example of a configuration of a management server according to the second embodiment.

FIG. 18 is a block diagram illustrating an example of a configuration of the management server 300 according to the second embodiment. Referring to FIG. 18, the management server 300 includes the communication unit 210, a reading result DB 320, and a DB processing unit 390.

The reading result DB 320 is constituted by tables for managing data indicating results of tag reading performed by one or more of the tag readers 100. In the present embodiment, the reading result DB 320 includes the floor table 230, the map table 235, the position tag table 240, the target tag table 250, a camera table 360, a reader table 365, the movement amount table 270, and the tag detection table 280. The DB processing unit 390 is a collection of a plurality of software modules that provide functions for controlling storage of the tag reading results by the reading result DB 320 and display of videos based on the tag reading results. The individual software modules may operate by executing computer programs stored in a memory (not shown) by one or more processors (not shown) of the management server 300. Here, the memory may include a non-transitory computer-readable storage medium. In the present embodiment, the DB processing unit 390 includes a registration unit 391, a data management unit 392, and a UI control unit 393.

<2-3-2. Examples of Data Configurations>

FIGS. 19A to 19C illustrate respective configuration examples of the camera table 360, the reader table 365, and the tag detection table 280 of the reading result DB 320.

The camera table 360 has three data elements, namely Tag ID 361, Camera ID 362, and Floor ID 363. Tag ID 361 is identification information that uniquely identifies a camera tag 51 attached to each of capturing apparatuses. Camera ID 362 is identification information that uniquely identifies each capturing apparatus. Floor ID 363 indicates the floor 10 where each capturing apparatus is installed, using a value of Floor ID 231 in the floor table 230.

The reader table 365 has three data elements, namely Reader ID 366, Moving Entity ID 367, and Name 368. Reader ID 366 is identification information that uniquely identifies each tag reader 100. Moving Entity ID 367 is identification information that uniquely identifies a moving entity moving with each tag reader 100. Name 368 indicates the name of each moving entity. In the example in FIG. 19B, the name of the moving entity identified by the reader ID "RD0C" or the moving entity ID "MV0C" is "User C". The name of the moving entity identified by the reader ID "RD0D" or the moving entity ID "MV0D" is "Vehicle D".

The configuration of the tag detection table 280 may be similar to that in the first embodiment. That is, the tag detection table 280 has four data elements, namely Tag ID 281, Reading Time 282, Reader ID 283, and Detection Position 284. In the example in FIG. 19C, it can be seen, from one of the records illustrated, that the camera tag 51 identified by tag ID "TG3A" was detected by the tag reader 100c identified by the reader ID "RD0C" at time "T22". It can also be seen, from another record, that the camera tag 51 identified by tag ID "TG3A" was detected by the tag reader 100d identified by the reader ID "RD0D" at time "T28".

<2-3-3. Data Registration>

The contents of the floor table 230, the map table 235, the position tag table 240, the target tag table 250, and the camera table 360 may be determined in advance by a user. The registration unit 391 accepts inputs of determined contents of the tables, and registers the respective contents in the corresponding tables.

The association between the reader ID and the moving entity ID in the reader table 365 may also be determined and registered in advance by a user. Alternatively, in one alteration example, the association between the reader ID and the moving entity ID may be recognized dynamically when an attempt is made to read the tag. For example, the user 30 carries a user tag, which is a fourth type of RFID tag, and the tag reader 100 reads the user ID from the user tag and transmits the reading result data to the management server 300. If the received reading result data includes the reading result for the user tag, the registration unit 391 may register, in the reader table 365, an association between the reader ID of the tag reader 100 from which the reading result data was transmitted and the user ID indicated by the reading result. In this alteration example, the reader table 365 may include an additional data element indicating a validity period of each association.

<2-3-4. Tag Detection>

Like the data management unit 292 according to the first embodiment, the data management unit 392 adds one or more records of measurement result data received from the tag reader 100 via the communication unit 210 to the movement amount table 270. The data management unit 392 can derive an absolute position of the tag reader 100 based on the relative amount of movement indicated by the measurement result data and the known position coordinates of the position tag 11 whose tag ID was read by the tag reader 100. The data management unit 392 adds the position coordinates indicating the absolute position of the tag reader 100 derived in this manner to the column of Measurement Position 274 in the movement amount table 270.

The data management unit 392 also adds one or more records of the reading result data received from the tag reader 100 to the tag detection table 280. Here, the RFID tag can include the camera tag 51. The data management unit 392 may add the value of Measurement Position 274 indicated by the corresponding measurement result record in the movement amount table 270 to the column of Detection Position 284 for the reading result from the camera tag 51 as well. As an alternative, the position information of Detection Position 284 may be omitted for the camera tag 51 of the camera 50 that is fixedly installed.

In the present embodiment, adding the tag ID read from the camera tag 51 by the tag reader 100, and the reading time thereof, to the tag detection table 280 along with the reader ID means that the reading result is associated with a video captured by the camera 50. This is because converting the tag ID of the reading result record to a camera ID according to the definitions in the camera table 360 makes it possible to access the scene of the corresponding video in the video DB 180 based on the combination of the camera ID and the reading time. In this manner, the data management unit 392 causes the reading result from the tag reader 100 to be stored in the reading result DB 320 in association with the video so that a portion in the video, captured by the camera 50, corresponding to the reading time of the tag ID from the camera tag 51 is able to be extracted.

Figure 20:
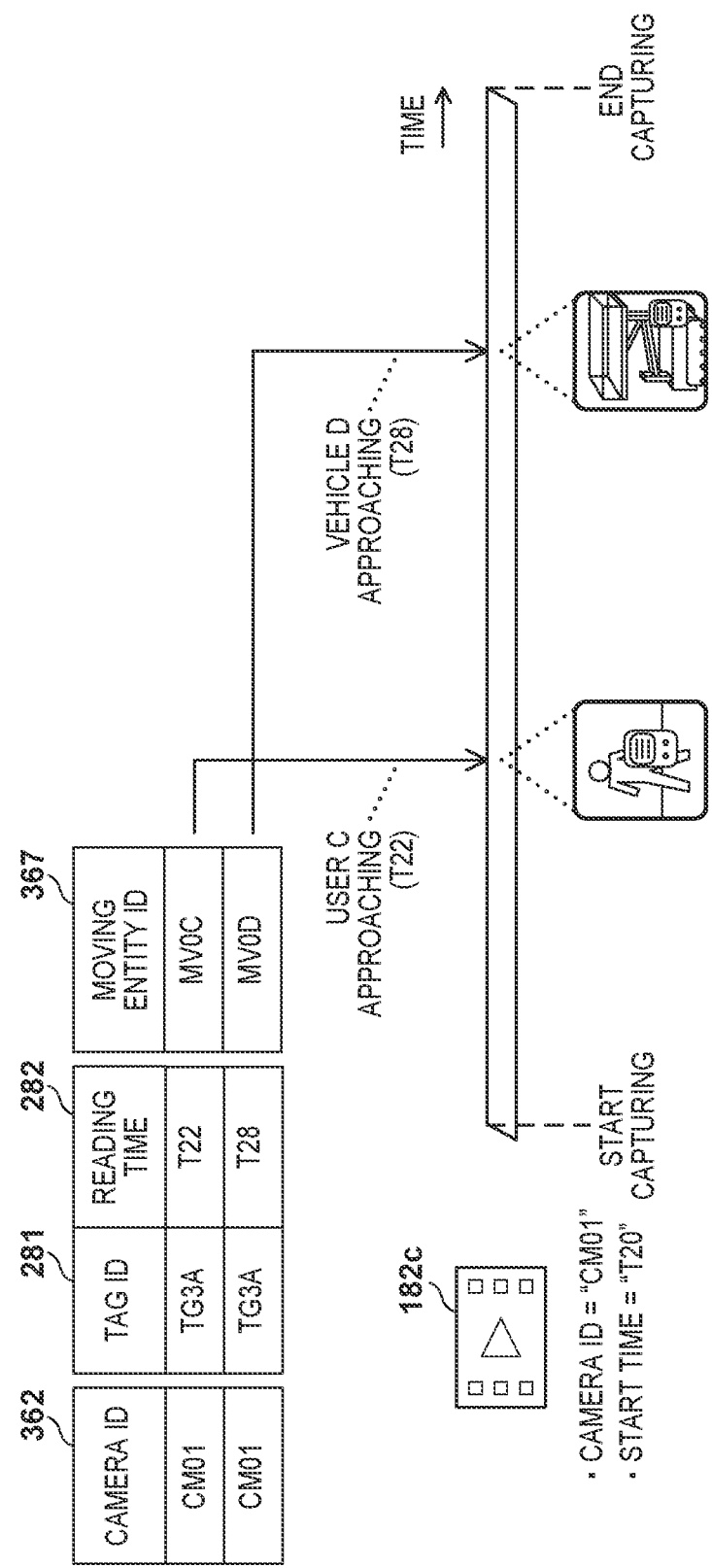
FIG. 20 is an explanatory diagram for explaining association of tag reading results with a video in the second embodiment.

FIG. 20 is an explanatory diagram illustrating the above-described association of the tag reading result with the video. As an example, it is assumed here that the two reading result records in the tag detection table 280 indicate that the tag ID "TG3A" was read at times "T22" and "T28". Additionally, the reader ID indicated by the first record is assumed to be associated with the moving entity ID "MV0C" in the reader table 365, and the reader ID indicated by the second record is assumed to be associated with the moving entity ID "MV0D" in the reader table 365. The lower part of FIG. 20 conceptually illustrates a video 182c captured by the camera 50 identified by the camera ID "CM01" during a period that starts at time "T20" and includes times "T22" and "T28". The band extending to the right from the video 182c represents the progress of the video along the time axis.

Here, it is assumed that the user 30b wishes to browse scenes in which the user 30c, who is one moving entity ("User C"), is present. The tag detection table 280 indicates that the camera tag 51 was detected at time T22 by the tag reader 100c that moves with the user 30c. Accordingly, by displaying the scene corresponding to time T22 of the video 182c, the user 30b can immediately browse the scene in which the user 30c is present without having to exhaustively examine the entirety of the video 182c. The same applies to cases where the user intends to browse scenes in which the vehicle 35d is present.

In the present embodiment, too, the camera 50 may be a 360-degree camera. Each tag reader 100 may also be a reading apparatus capable of reading over 360 degrees.

<2-3-5. Control of Display (Reproduction)>

The UI control unit 393 accepts, on the screen of the user terminal 70, for example, a selection of a moving entity which is of interest to the user 30 from among the one or more moving entities being managed by the system. The reader ID of the tag reader 100 that moves with the moving entity selected here will be referred to as a first reader ID for explanatory purposes. The UI control unit 393 also accepts a selection of a camera 50 installed on the floor 10 that is of interest to the user 30. The tag ID of the camera tag 51 of the camera 50 selected here will be referred to as a first tag ID for explanatory purposes. The UI control unit 393 controls the user terminal 70 to display a scene corresponding to the reading time of the first tag ID in a video associated with the reading result that includes the first reader ID and the first tag ID. For example, the UI control unit 393 may present the user with a list of one or more candidate videos that are associated with the one or more reading results that include the first reader ID and the first tag ID, respectively, and then allow the user to select the desired video in the presented list. In this case, the user terminal 70 may trigger reproduction of the scene in which the selected moving entity may be present by transmitting a reproduction request including scene designation information based on the reading time of the first tag ID from the camera tag 51 to the video server 150.

<2-4. Summary of Second Embodiment>

According to the second embodiment described in this section, a reading apparatus that moves with each of one or more moving entities reads a tag ID from a camera tag attached to a capturing apparatus while a video of a real space is being captured by the capturing apparatus. A result of the tag reading by the reading apparatus is then stored in a database in association with the video captured by the capturing apparatus, so that a portion in the video corresponding to the reading time of each tag ID is able to be extracted. Accordingly, if the user wishes to browse a scene in which a specific moving entity is present, the user can access the scene in which the moving entity is present based on the reading time of the tag ID from the camera tag by the reading apparatus that has moved with the moving entity. There is thus no need for the user to exhaustively examine the entire video. Additionally, as the system according to the present embodiment does not require image recognition to discern between moving entities, it functions effectively even in situations where the appearance of a moving entity is unknown or variable.

3. Third Embodiment

In a third embodiment, described in this section, a capturing apparatus is assumed to be carried by, worn by, or mounted on a moving entity, while reading apparatuses are installed in a real space. Accordingly, the capturing apparatus is an apparatus that is physically separate from the reading apparatus. An RFID tag is attached to the capturing apparatus as a target tag, and the reading apparatuses attempt to read a tag ID while the capturing apparatus is capturing a video.

<3-1. System Overview>

Figure 21:
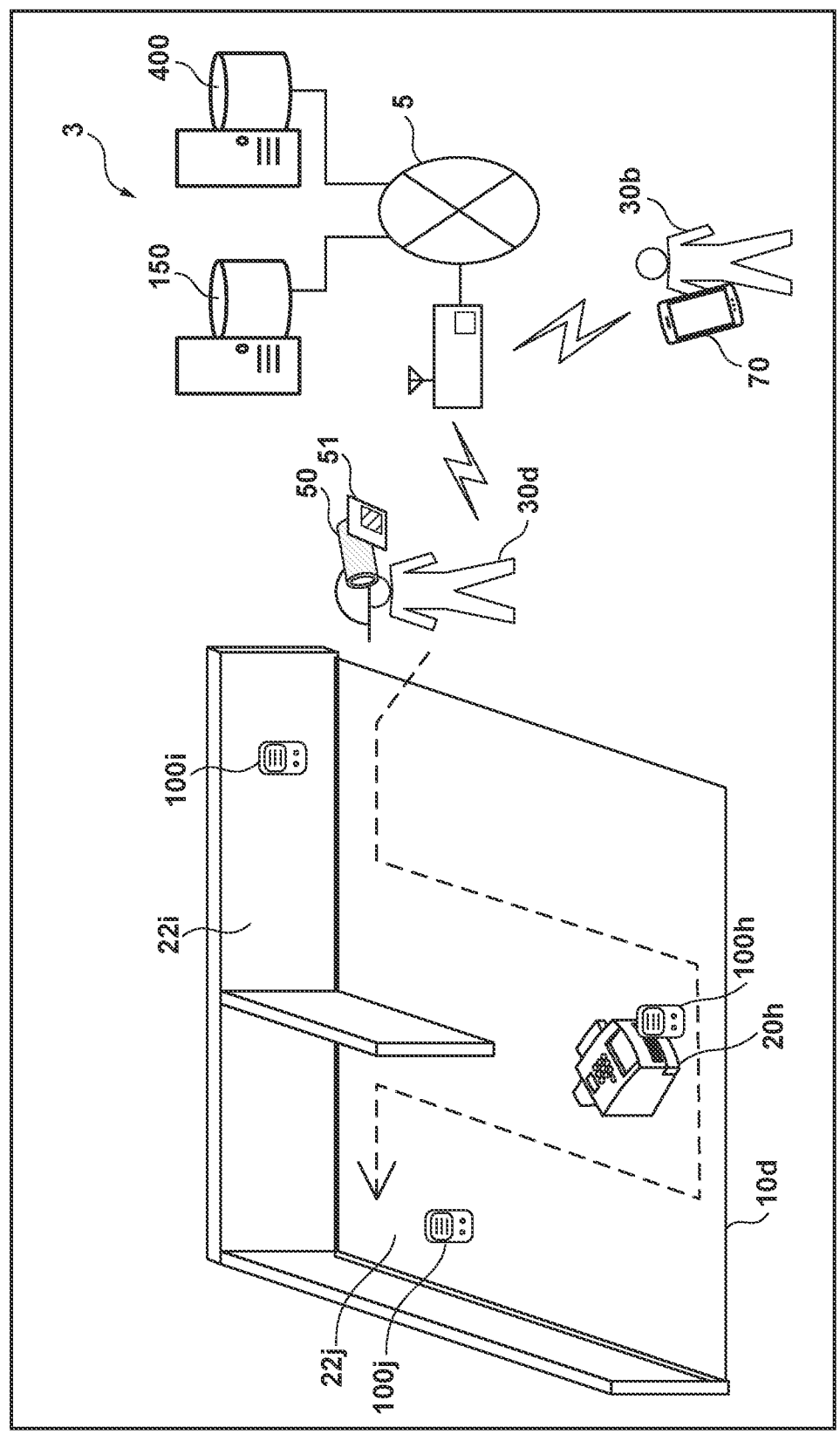
FIG. 21 is a schematic view illustrating an example of a configuration of a video management system according to a third embodiment.

FIG. 21 is a schematic diagram illustrating an example of a configuration of a video management system 3 according to the third embodiment. Like the video management systems 1 and 2, the video management system 3 is a system that manages videos of a real space captured by cameras using a database and allows the videos to be browsed by users.

FIG. 21 illustrates a floor 10d as an example of the real space. An item 20h is placed on the floor 10d, and a tag reader 100h is mounted on the item 20h. Additionally, the tag reader 100i is attached to a wall 22i on the floor 10d, and a tag reader 100j is attached to a floor surface 22j.

A user 30d is a worker involved in the construction on the floor 10d, and is a moving entity. The user 30d wears a helmet equipped with the camera 50 and periodically patrols the floor 10d (e.g., along the broken line arrow in the figure). The camera tag 51 is attached to the camera 50. The videos captured by the camera 50 are transmitted to the video server 150 and stored in a database.

While the user 30d is patrolling the floor 10d, the camera 50 captures videos, and the tag readers 100h, 100i, and 100j attempt to read information from RFID tags. At this time, the results of reading of information from the camera tag 51 by the tag readers 100h, 100i, and 100j are stored in a database in association with the video captured by the camera 50, which makes it possible to extract a scene corresponding to each reading time from that video. Note that the camera 50 may be carried by, worn by, or mounted on another type of moving entity rather than a user.

<3-2. Overall System Configuration>

The video management system 3 includes the camera 50, the user terminal 70, the tag reader 100, the video server 150, and a management server 400. The user terminal 70, the tag reader 100, the video server 150, and the management server 400 are connected to each other via the network 5. Examples of the configurations of the camera 50, the user terminal 70, the tag reader 100, and the video server 150 have already been described, and will therefore not be described again here.

The management server 400 is an information processing apparatus that has a database which stores the results of tag reading by the tag readers 100 (e.g., the tag readers 100*h*, 100*i*, and 100*j*). The management server 400 may be implemented as an application server, a database server, or a cloud server, for example, by using a high-end general-purpose computer. Similar to the management servers 200 and 300 described above, the management functions of the management server 400 may be provided by a single apparatus, or by physically-separate multiple apparatuses which operate in conjunction with each other. The video server 150 and the management server 400 may be realized as an integrated single server apparatus.

<3-3. Configuration Example of Management Server>

<3-3-1. Basic Configuration>

Figure 22:
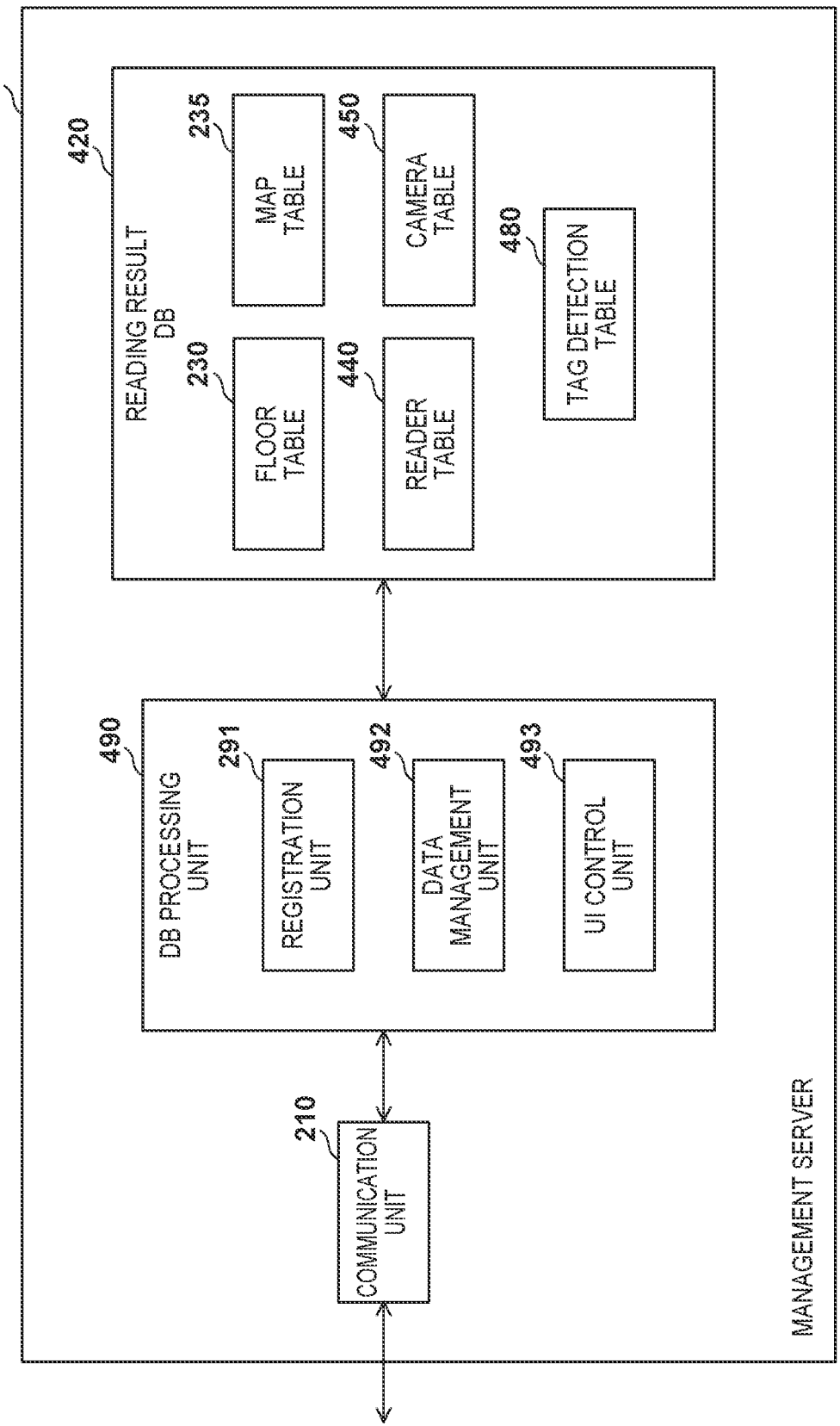
FIG. 22 is a block diagram illustrating an example of a configuration of a management server according to the third embodiment.

FIG. 22 is a block diagram illustrating an example of a configuration of the management server 400 according to the third embodiment. Referring to FIG. 22, the management server 400 includes the communication unit 210, a reading result DB 420, and a DB processing unit 490.

The reading result DB 420 is constituted by tables for managing data indicating results of tag reading performed by one or more of the tag readers 100. In the present embodiment, the reading result DB 420 includes the floor table 230, the map table 235, a reader table 440, a camera table 450, and a tag detection table 480. The DB processing unit 490 is a collection of a plurality of software modules that provide functions for controlling storage of the tag reading results by the reading result DB 420 and display of videos based on the tag reading results. The individual software modules may operate by executing computer programs stored in a memory (not shown) by one or more processors (not shown) of the management server 400. Here, the memory may include a non-transitory computer-readable storage medium. In the present embodiment, the DB processing unit 490 includes the registration unit 291, a data management unit 492, and a UI control unit 493.

<3-3-2. Examples of Data Configurations>

Figure 23A:
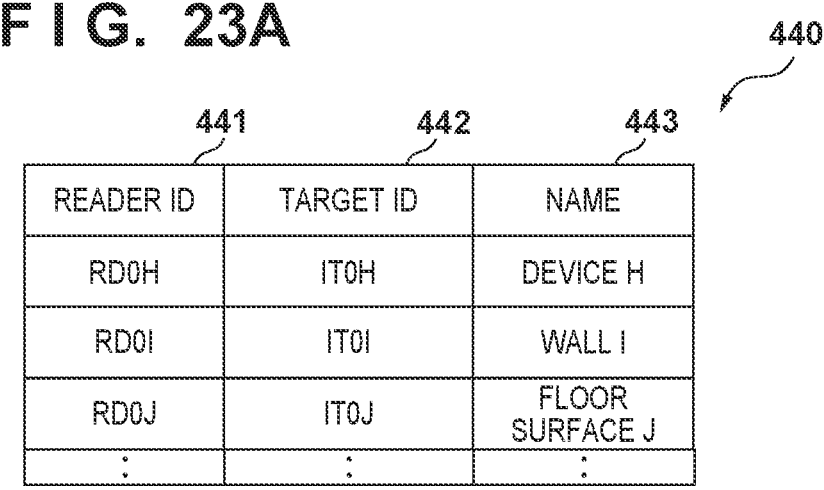
FIG. 23A is an explanatory diagram illustrating an example of a configuration of a reader table according to the third embodiment.
Figure 23B:
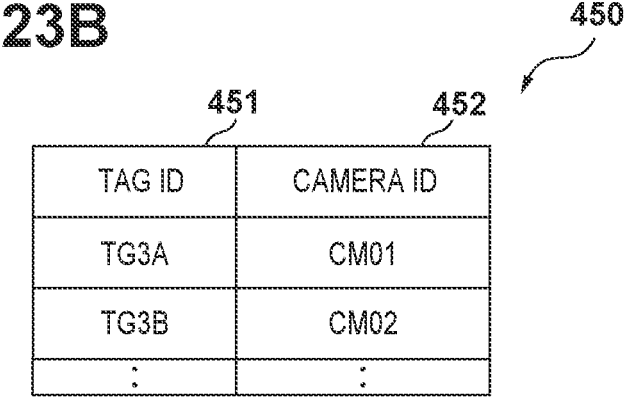
FIG. 23B is an explanatory diagram illustrating an example of a configuration of a camera table according to the third embodiment.
Figure 23C:
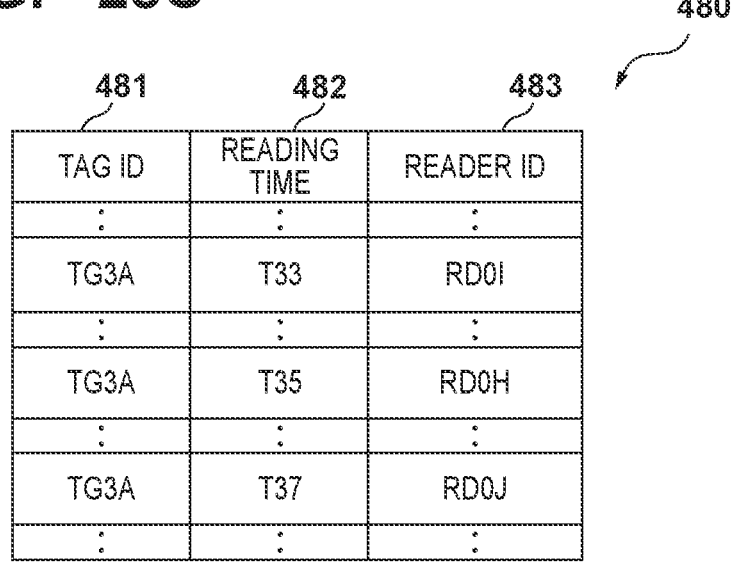
FIG. 23C is an explanatory diagram illustrating an example of a configuration of a tag detection table according to the third embodiment.

FIGS. 23A to 23C illustrate respective configuration examples of the reader table 440, the camera table 450, and the tag detection table 480 of the reading result DB 420.

The reader table 440 has three data elements, namely Reader ID 441, Target ID 442, and Name 443. Reader ID 441 is identification information that uniquely identifies each tag reader 100. Target ID 442 is identification information that uniquely identifies the management target to which each tag reader 100 is attached. Name 443 indicates a name of each management target. In the example in FIG. 23A, the name of the management target identified by the reader ID "RD0H" or the target ID "IT0H" is "Device H". The name of the management target identified by the reader ID "RD0I" or the target ID "IT0I" is "Wall I". The name of the management target identified by the reader ID "RD0J" or the target ID "IT0J" is "Floor Surface J".

The camera table 450 has two data elements, namely Tag ID 451 and Camera ID 452. Tag ID 451 is identification information that identifies the camera tag 51 attached to each of capturing apparatuses. Camera ID 452 is identification information that uniquely identifies each capturing apparatus.

The tag detection table 480 has three data elements, namely Tag ID 481, Reading Time 482, and Reader ID 483. That is, compared to the tag detection table 280 according to the first embodiment and the second embodiment, the tag detection table 480 does not include a data element corresponding to Detection Position 284. The first reading result record in the tag detection table 480 illustrated in FIG. 23C indicates that the tag reader 100*i* identified by the reader ID "RD0I" detected the camera tag 51 identified by the tag ID "TG3A" at time "T33". The second reading result record indicates that the tag reader 100*h* identified by the reader ID "RD0H" detected the same camera tag 51 at time "T35". The third reading result record indicates that the tag reader 100*j* identified by the reader ID "RD0J" detected the same camera tag 51 at time "T37".

<3-3-3. Tag Detection>

The data management unit 492 adds one or more records of the reading result data received from the tag readers 100 to the tag detection table 480. Here, the RFID tag can include the camera tag 51. In the present embodiment, adding the tag ID read from the camera tag 51 by each tag reader 100, and the reading time thereof, to the tag detection table 480 along with the reader ID means that the reading result is associated with a video captured by the camera 50. This is because converting the tag ID of the reading result record to a camera ID according to the definitions in the camera table 450 makes it possible to access the scene of the corresponding video in the video DB 180 based on the combination of the camera ID and the reading time. In this manner, the data management unit 492 causes a reading result from a tag reader 100 to be stored in the reading result DB 420 in association with a video so that a portion in the video, captured by the camera 50, corresponding to the reading time of the tag ID from the camera tag 51 is able to be extracted.

FIG. 24 is an explanatory diagram illustrating the above-described association of the tag reading result with the video. As an example, it is assumed here that the three reading result records in the tag detection table 480 indicate that the tag ID "TG3A" was read at times "T33", "T35", and "T37". Additionally, the reader IDs indicated by the first, second, and third records are assumed to be associated with the target IDs "IT0I", "IT0H", and "IT0J", respectively, in the reader table 440. The lower part of FIG. 24 conceptually illustrates a video 182*d* captured by the camera 50 identified by the camera ID "CM01" during a period that starts at time "T30" and includes times "T33", "T35", and "T37". The band extending to the right from the video 182*d* represents the progress of the video along the time axis.

Here, it is assumed that the user 30*b* wishes to browse scenes in which the floor surface 22*j* ("Floor Surface J"), which is one of the management targets, is present. The tag detection table 480 indicates that the camera tag 51 was detected at time T37 by the tag reader 100*j* identified by the reader ID "RD0J" attached to the floor surface 22*j*. Accordingly, by displaying the scene corresponding to time T37 of the video 182*d*, the user 30*b* can immediately browse the scene in which the floor surface 22*j* is present without having to exhaustively examine the entirety of the video 182*d*. The same applies to cases where the user intends to browse scenes in which another management target is present.

In the present embodiment, too, the camera 50 may be a 360-degree camera. Each tag reader 100 may also be a reading apparatus capable of reading over 360 degrees.

<3-3-4. Control of Display (Reproduction)>

The UI control unit 493 accepts, on the screen of the user terminal 70, for example, a selection of a management target which the user 30 wishes to browse from among the one or more management targets being managed by the system. The reader ID of the tag reader 100 that is attached to the management target selected here will be referred to as a first reader ID for explanatory purposes. The UI control unit 493 also accepts a selection of a camera 50 that is of interest to the user 30. The tag ID of the camera tag 51 of the camera 50 selected here will be referred to as a first tag ID for explanatory purposes. The UI control unit 493 controls the user terminal 70 to display a scene corresponding to the reading time of the first tag ID in a video associated with the reading result that includes the first reader ID and the first tag ID. For example, the UI control unit 493 may present the user with a list of one or more candidate videos that are associated with the one or more reading results that include the first reader ID and the first tag ID, respectively, and then allow the user to select the desired video in the presented list. In this case, the user terminal 70 may trigger reproduction of the scene in which the selected management target may be present by transmitting a reproduction request including scene designation information based on the reading time of the first tag ID from the camera tag 51 to the video server 150.

<3-4. Summary of Third Embodiment>

According to the third embodiment described in this section, a reading apparatus attached to each of one or more management targets reads a tag ID from a camera tag attached to a capturing apparatus while a video of a real space is being captured by the capturing apparatus. Results of the tag reading by the reading apparatuses are then stored in a database in association with the video captured by the capturing apparatus, so that a portion in the video corresponding to the reading time of each tag ID is able to be extracted. Accordingly, if the user wishes to browse a scene in which a specific management target is present, the user can access the scene in which the management target is present based on the time at which the tag ID is read from the camera tag by the reading apparatus attached to that management target. There is thus no need for the user to exhaustively examine the entire video. Additionally, as the system according to the present embodiment does not require image recognition to discern between management targets, it functions effectively even in situations where the appearance of a management target can change over time rather than being static.

Note that the first, second, and third embodiments described in the present specification, as well as the first practical example, the second practical example, and the alteration examples, may be combined with each other in any way. The features described in connection with a given embodiment, and the advantageous effects thereof, are applicable to other embodiments unless explicitly stated otherwise.

The present specification has mainly described an example in which the technology according to the present disclosure is applied in video recording at a construction site. However, the technology according to the present disclosure is not limited to a construction site, and can be applied in a variety of situations where video may be recorded. For example, the technology according to the present disclosure may be applied in situations such as logistics, inventory management, or livestock management in livestock industries.

The present invention can facilitate an easier access to a scene in which a specific target is present within a video.

4. Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A video management system for managing a video of a real space captured by a capturing apparatus, comprising:
 a first reading apparatus that moves in the real space and includes a first reading unit configured to emit an electromagnetic wave to a tag reading range and read information that is sent back from a radio frequency identification (RFID) tag utilizing energy of the electromagnetic wave;
 a first RFID tag that is attached to a first management target and stores first tag identification information;
 a second RFID tag that is installed at a known position in the real space and stores second tag identification information; and
 a data management unit configured to cause a database to store a reading result of the first tag identification information and position information of the first reading apparatus derived based on a reading result of the second tag identification information in association with the video so that a portion in the video captured by the capturing apparatus corresponding to a time at which the first tag identification information has been read from the first RFID tag by the first reading unit is able to be extracted.

2. The video management system according to claim 1, wherein the first reading unit is configured to attempt reading of tag identification information while the capturing apparatus is capturing the video; and the data management unit is configured to cause the database to store the first tag identification information and a reading time of the first tag identification information in association with the video in a case where the first tag identification information has been read from the first RFID tag by the first reading unit.

3. The video management system according to claim 2, wherein the video is stored together with information that identifies the capturing apparatus and a capturing time of the video, and the data management unit is configured to associate the reading result of the first tag identification information with the video via the information that identifies the capturing apparatus.

4. The video management system according to claim 2, wherein the video management system further comprises a controlling unit configured to, in a case where the first management target is selected by a user from among one or more management targets, cause the portion in the video associated with the reading result of the first tag identification information to be reproduced on a screen, the portion corresponding to the reading time of the first tag identification information.

5. The video management system according to claim 4, wherein the control unit is configured to:

in a case where the first management target is selected by the user, present a list of one or more candidate videos that are respectively associated with one or more reading results including the first tag identification information to the user, and cause a portion in a video selected by the user from among the one or more candidate videos to be reproduced on the screen, the portion corresponding to a reading time of the first tag identification information.

6. The video management system according to claim 1, wherein the first reading apparatus is physically separate from the capturing apparatus.

7. The video management system according to claim 6, wherein the capturing apparatus and the first reading apparatus are carried by, worn by, or mounted on a first moving entity.

8. The video management system according to claim 1, wherein the capturing apparatus is integrated with the first reading apparatus.

9. The video management system according to claim 1, wherein the video management system further comprises a measuring unit that moves together with the first reading apparatus and is configured to measure a relative amount of movement in the real space, wherein the position information of the first reading apparatus is derived further based on the amount of movement measured by the measuring unit.

10. The video management system according to claim 9, wherein the position information is derived based on a position at which the second tag identification information has been read from the second RFID tag by the first reading unit and the relative amount of movement from that position measured by the measuring unit.

11. The video management system according to claim 9, wherein the measuring unit is configured to measure the relative amount of movement based on sensor data output from a three-axis acceleration sensor, a gyro sensor, and a geomagnetic sensor.

12. The video management system according to claim 9, wherein the video management system further comprises a control unit configured to cause a trajectory of movement of the first reading apparatus and a reading position at which the first tag identification information has been read from the first RFID tag by the first reading unit to be displayed on a screen based on the position information, wherein the control unit is configured to cause a portion in the video corresponding to a point designated by a user on the screen to be reproduced on the screen.

13. The video management system according to claim 1, wherein the video management system further comprises a third RFID tag that is attached to the capturing apparatus, wherein the first reading unit is configured to read, from the third RFID tag, information for associating a reading result of the first tag identification information from the first RFID tag with the video captured by the capturing apparatus.

14. The video management system according to claim 1, wherein the capturing apparatus is a 360-degree camera.

15. A video management method performed by a first reading apparatus that moves in a real space, the video management method comprising:

while a capturing apparatus is capturing a video of the real space, emitting an electromagnetic wave to a tag reading range;

reading second tag identification information from a second radio frequency identification (RFID) tag that is installed at a known position in the real space and stores the second tag identification information;

reading first tag identification information from a first RFID tag that is attached to a first management target and stores the first tag identification information; and causing a database to store a reading result of the first tag identification information and position information of the first reading apparatus derived based on a reading result of the second tag identification information in association with the video so that a portion in the video corresponding to a reading time of the first tag identification information is able to be extracted.

16. A reading apparatus that moves in a real space comprising:

a communication unit configured to communicate with an information processing apparatus that manages data related to a video, a reading unit configured to emit an electromagnetic wave to a tag reading range and read information that is sent back from a first radio frequency identification (RFID) tag and a second RFID tag utilizing energy of the electromagnetic wave while a capturing apparatus is capturing a video of the real space, wherein the first RFID tag is attached to a first management target and stores first tag identification information and the second RFID tag is installed at a known position in the real space and stores second tag identification information; and a control unit configured to, in a case where the first and second tag identification information has been read by the reading unit from the first and second RFID tags, transmit reading results for the first and second tag identification information via the communication unit to the information processing apparatus thereby causing the information processing apparatus to store, in a database, the reading result of the first tag identification information and position information of the reading apparatus derived based on a reading result of the second tag identification information in association with the video so that a portion in the video captured by the capturing apparatus corresponding to a reading time of the first tag identification information is able to be extracted.

17. An information processing apparatus for managing a video of a real space captured by a capturing apparatus, comprising:
- a communication unit configured to communicate with a reading apparatus that moves in the real space and reads information sent back from a first radio frequency identification (RFID) tag and a second RFID tag utilizing energy of an electromagnetic wave emitted to a tag reading range, wherein the first RFID tag is attached to a first management target and stores first tag identification information and the second RFID tag is installed at a known position in the real space and stores second tag identification information; and
- a data management unit configured to:
- obtain position information of the reading apparatus derived based on a reading result of the second tag identification information; and
- in a case where a reading result indicating that the reading apparatus has read the first tag identification information from the first RFID tag is received via the communication unit, cause a database to store the received reading result and the obtained position information in association with the video so that a portion in the video captured by the capturing apparatus corresponding to a time at which the first tag identification information has been read by the reading apparatus is able to be extracted.

* * * * *